(12) United States Patent
Harazono et al.

(10) Patent No.: US 11,235,834 B2
(45) Date of Patent: Feb. 1, 2022

(54) LEANING VEHICLE

(71) Applicant: YAMAHA HATSUDOKI KABUSHIKI KAISHA, Iwata (JP)

(72) Inventors: Yasunobu Harazono, Iwata (JP); Nobuo Hara, Iwata (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 157 days.

(21) Appl. No.: 16/820,082

(22) Filed: Mar. 16, 2020

(65) Prior Publication Data

US 2020/0277018 A1    Sep. 3, 2020

Related U.S. Application Data

(63) Continuation of application No. PCT/JP2018/033721, filed on Sep. 11, 2018.

(30) Foreign Application Priority Data

Nov. 1, 2017    (JP) .............................. JP2017-211547

(51) Int. Cl.
   *B62K 17/00*    (2006.01)
   *B62K 11/02*    (2006.01)
   *B62K 11/14*    (2006.01)

(52) U.S. Cl.
   CPC .............. *B62K 17/00* (2013.01); *B62K 11/02* (2013.01); *B62K 11/14* (2013.01)

(58) Field of Classification Search
   None
   See application file for complete search history.

(56) References Cited

U.S. PATENT DOCUMENTS 10,232,904 B2 *   3/2019   Toyota ................... B62K 21/18
10,543,866 B2 *   1/2020   Araki ..................... B62K 21/00
(Continued)

FOREIGN PATENT DOCUMENTS

| CA | 3005812 A1 | 5/2017 |
| EP | 3446955 A1 | 2/2019 |
| JP | 2011073624 A | 4/2011 |

(Continued)

*Primary Examiner* — Kevin Hurley
(74) *Attorney, Agent, or Firm* — Rabin & Berdo, P.C.

(57) ABSTRACT

A leaning vehicle includes an actuator control unit that causes an actuator to generate an actuator torque in a counterclockwise direction based on a bar-handle-rotation-moment change amount in the case where a bar-handle-rotation-moment change amount in the counterclockwise direction is generated by a rider performing one operation of a right-grip-pushing-force increasing operation, a left-grip-pulling-force increasing operation, a right-grip-pulling-force reducing operation, and a left-grip-pushing-force reducing operation. The actuator control unit causes the actuator to generate an actuator torque in a clockwise direction based on a bar-handle-rotation-moment change amount in the case where a bar-handle-rotation-moment change amount in the clockwise direction is generated by a rider performing one operation of a left-grip-pushing-force increasing operation, a right-grip-pulling-force increasing operation, a left-grip-pulling-force reducing operation, and a right-grip-pushing-force reducing operation.

10 Claims, 13 Drawing Sheets

(56) References Cited

U.S. PATENT DOCUMENTS

2013/0066522 A1\* 3/2013 Haas ........................ B62J 27/00
 701/41
2020/0385082 A1\* 12/2020 Benkert ................... B62D 6/00

FOREIGN PATENT DOCUMENTS

| JP | 2013212709 A | 10/2013 | | |
|---|---|---|---|---|
| JP | 5405969 B2 | 2/2014 | | |
| WO | WO-2019106073 A1 * | 6/2019 | ............ | B60W 30/09 |

\* cited by examiner

| M' :Bar-Handle-Rotation-Moment Change Amount | ... | M'(−3) | M'(−2) | M'(−1) | 0 | M'(1) | M'(2) | M'(3) | ... |
|---|---|---|---|---|---|---|---|---|---|
| I:Control Current Tr: Acutuator Torque | ... | $\begin{matrix}I(-3)\\Tr(-3)\end{matrix}$ | $\begin{matrix}I(-2)\\Tr(-2)\end{matrix}$ | $\begin{matrix}I(-1)\\Tr(-1)\end{matrix}$ | 0 | $\begin{matrix}I(1)\\Tr(1)\end{matrix}$ | $\begin{matrix}I(2)\\Tr(2)\end{matrix}$ | $\begin{matrix}I(3)\\Tr(3)\end{matrix}$ | ... |

LEANING VEHICLE

TECHNICAL FIELD

The present teaching relates to a leaning vehicle provided with a bar handle.

BACKGROUND ART

Japanese Patent No. 5405969 (Patent Literature 1) discloses a steering mechanism for a motorcycle. This steering mechanism includes power assist means which applies an auxiliary steering force, generated by a motor, according to input torque inputted into a bar handle manipulated by an occupant. This steering mechanism includes input torque detection means, steering ratio detection means which detects a steering ratio, and roll angular velocity detection means which detects angular velocity of a vehicle body in a rolling direction. The steering ratio is a ratio of a rotation angle of the bar handle to the steering angle of a front wheel. The steering mechanism controls an auxiliary steering force, generated by the motor, based on input torque, a steering ratio, and angular velocity in the rolling direction. The steering mechanism also includes steering ratio change means which changes a steering ratio.

CITATION LIST

Patent Literature

Patent Literature 1: Japanese Patent No. 5405969

SUMMARY OF INVENTION

Technical Problem

In the above-mentioned prior art technique, a leaning posture is controlled by a bar handle, with a steering ratio as a factor. It is an object of the present teaching to provide a leaning vehicle where a leaning posture is controlled by a bar handle based on a factor which differs from a steering ratio in a manner which differs from a prior art technique.

In this specification, a bar handle means a handlebar type steering device. Accordingly, the bar handle includes both of a handlebar of a type where a grip is provided to each of both ends of one rod-shaped member and a handlebar of a type where a handlebar to which a left grip is provided and a handlebar to which a right grip is provided are formed of separate members.

Solution to Problem

The inventors have made studies in detail on a mode of controlling a leaning posture of a leaning vehicle by a bar handle. Hereinafter, a frontward direction in a leaning-vehicle front-rear direction is referred to as a leaning-vehicle frontward direction. A rearward direction in the leaning-vehicle front-rear direction is referred to as a leaning-vehicle rearward direction. A leftward direction in a leaning-vehicle left-right direction is referred to as a leaning-vehicle leftward direction. A rightward direction in the leaning-vehicle left-right direction is referred to as a leaning-vehicle rightward direction. An upward direction in a leaning-vehicle up-down direction is referred to as a leaning-vehicle upward direction. A downward direction in the leaning-vehicle up-down direction is referred to as a leaning-vehicle downward direction. A leaning-vehicle front-rear direction is referred to as a leaning vehicle front-rear direction.

When a rider of the leaning vehicle desires to turn in the leaning-vehicle rightward direction from a forward-direction traveling state, the rider pushes the right grip of the bar handle in the leaning-vehicle frontward direction. With such an operation, the steerable wheel of the leaning vehicle is steered in the leaning-vehicle leftward direction. The vehicle body frame of the leaning vehicle leans in a leaning-vehicle rightward direction. When the vehicle body frame leans in the leaning-vehicle rightward direction, the steerable wheel is steered in the leaning-vehicle rightward direction due to self-steering. As a result, the leaning vehicle turns in the leaning-vehicle rightward direction.

In the leaning vehicle, for example, there may be a case where moment by which the steerable wheel is steered in the leaning-vehicle rightward direction is generated due to self-steering during turning of the leaning vehicle in the leaning-vehicle rightward direction. That is, there may be a case where moment by which the steerable wheel is further steered in the leaning-vehicle rightward direction acts on the steerable wheel. This is a phenomenon specific to the leaning vehicle. In this case, to maintain a leaning posture during turning, a rider inputs, to a bar handle, a force which suppresses steering of the steerable wheel in the leaning-vehicle rightward direction. To perform such an operation, the rider maintains the steering by maintaining a pushing force which pushes the right grip of the bar handle in the leaning-vehicle frontward direction, for example.

To raise the vehicle body frame during turning of the leaning vehicle in the leaning-vehicle rightward direction, the rider steers the steerable wheel in the leaning-vehicle rightward direction. In this case, the rider reduces a pushing force which pushes the right grip of the bar handle in the leaning-vehicle frontward direction, or increases a pushing force which pushes the left grip of the bar handle in the leaning-vehicle frontward direction.

To further lean the vehicle body frame during turning of the leaning vehicle in the leaning-vehicle rightward direction, the rider steers the steerable wheel in the leaning-vehicle leftward direction. That is, the rider further increases a pushing force which pushes the right grip of the bar handle in the leaning-vehicle frontward direction, or increases a pulling force which pulls the left grip of the bar handle in the leaning-vehicle rearward direction. These manipulations are manipulations performed by a rider due to characteristics of the leaning vehicle.

The inventors have focused on the fact that a rider controls a leaning posture by performing a left-grip-pushing-force increasing operation where the rider increases a pushing force which pushes the left grip of the bar handle in the leaning-vehicle frontward direction, a right-grip-pulling-force increasing operation where the rider increases a pulling force which pulls the right grip of the bar handle in the leaning-vehicle rearward direction, a right-grip-pushing-force reducing operation where the rider reduces a pushing force which pushes the right grip of the bar handle in the leaning-vehicle frontward direction, a left-grip-pulling-force reducing operation where the rider reduces a pulling force which pulls the left grip of the bar handle in the leaning-vehicle rearward direction, a right-grip-pushing-force increasing operation where the rider increases a pushing force which pushes the right grip of the bar handle in the leaning-vehicle frontward direction, a left-grip-pulling-force increasing operation where the rider increases a pulling force which pulls the left grip of the bar handle in the leaning-vehicle rearward direction, a left-grip-pushing-force reducing operation where the rider reduces a pushing force which pushes the left grip of the bar handle in the leaning-vehicle frontward direction, or a right-grip-pulling-force reducing operation where the rider reduces a pulling force which pulls the right grip of the bar handle in the leaning-vehicle rearward direction. Hereinafter, the left-grip-pushing-force increasing operation, the right-grip-pulling-force increasing operation, the right-grip-pushing-force reducing operation, the left-grip-pulling-force reducing operation, the right-grip-pushing-force increasing operation, the left-grip-pulling-force increasing operation, the left-grip-pushing-force reducing operation, and the right-grip-pulling-force reducing operation are collectively referred to as "grip manipulation operation". The inventors have found that a leaning posture can be controlled by the bar handle by applying moment by which the steerable wheel is steered, corresponding to a grip manipulation operation.

In view of the above, the inventors have made extensive studies on means for detecting a grip manipulation operation through trial and error. As a result, the inventors have found that a bar-handle-rotation-moment change amount reflects the grip manipulation operation. The bar-handle-rotation-moment change amount is an amount of change in rotation moment of the bar handle (bar-handle rotation moment) per unit time. The bar-handle rotation moment is generated by the sum of a force in the leaning vehicle front-rear direction which is to be inputted into the left grip of the bar handle and a force in the leaning vehicle front-rear direction which is to be inputted into the right grip of the bar handle.

A leaning vehicle of (1) includes:

a vehicle body frame leaning in a leaning-vehicle leftward direction at a time of turning of the leaning vehicle in the leaning-vehicle leftward direction and leaning in a leaning-vehicle rightward direction at a time of turning of the leaning vehicle in the leaning-vehicle rightward direction, a leaning-vehicle frontward direction being a frontward direction in a front-rear direction of the leaning-vehicle, a leaning-vehicle rearward direction being a rearward direction in the front-rear direction of the leaning-vehicle, a leaning-vehicle leftward direction being a leftward direction in a left-right direction of the leaning-vehicle, a leaning-vehicle rightward direction being a rightward direction in the left-right direction of the leaning-vehicle, a vehicle-body-frame up-down direction being an up-down direction of the vehicle body frame, a vehicle-body-frame left-right direction being a left-right direction of the vehicle body frame, a vehicle-body-frame upward direction being an upward direction in the vehicle-body-frame up-down direction, a vehicle-body-frame leftward direction being a leftward direction in the vehicle-body-frame left-right direction, and a vehicle-body-frame rightward direction being a rightward direction in the vehicle-body-frame left-right direction;

a bar handle being supported on the vehicle body frame such that the bar handle is allowed to rotate about an axis extending in the vehicle-body-frame up-down direction, the bar handle including a left grip and a right grip, the left grip being positioned further leftward in the vehicle-body-frame leftward direction than a center of the vehicle body frame in the vehicle-body-frame left-right direction, and the right grip being positioned further rightward in the vehicle-body-frame rightward direction than the center of the vehicle body frame in the vehicle-body-frame left-right direction;

a steerable wheel being supported on the vehicle body frame such that the steerable wheel is allowed to rotate about an axle, the steerable wheel being steered in the leaning-vehicle leftward direction in response to the bar handle being rotated by a rider in a counterclockwise direction as viewed in the vehicle-body-frame downward direction, and the steerable wheel being steered in the leaning-vehicle rightward direction in response to the bar handle being rotated by the rider in a clockwise direction as viewed in the vehicle-body-frame downward direction;

an actuator configured to generate an actuator torque causing the bar handle to rotate in the counterclockwise direction or in the clockwise direction as viewed in the vehicle-body-frame downward direction;

a bar-handle-input-operation acquiring unit configured to acquire a bar-handle-rotation-moment change amount being generated by a rider performing one operation of a left-grip-pushing-force increasing operation where the rider increases a pushing force pushing the left grip in the leaning-vehicle frontward direction, a right-grip-pulling-force increasing operation where the rider increases a pulling force pulling the right grip in the leaning-vehicle rearward direction, a left-grip-pulling-force reducing operation where the rider reduces a pulling force pulling the left grip in the leaning-vehicle rearward direction, a right-grip-pushing-force reducing operation where the rider reduces a pushing force pushing the right grip in the leaning-vehicle frontward direction, a right-grip-pushing-force increasing operation where the rider increases a pushing force pushing the right grip in the leaning-vehicle frontward direction, a left-grip-pulling-force increasing operation where the rider increases a pulling force pulling the left grip in the leaning-vehicle rearward direction, a right-grip-pulling-force reducing operation where the rider reduces a pulling force pulling the right grip in the leaning-vehicle rearward direction, and a left-grip-pushing-force reducing operation where the rider reduces a pushing force pushing the left grip in the leaning-vehicle frontward direction, bar-handle rotation moment being rotation moment causing the bar handle to rotate in the counterclockwise direction or in the clockwise direction as viewed in the vehicle-body-frame downward direction, and the bar-handle-rotation-moment change amount being an amount of change in the bar-handle rotation moment per unit time;

and an actuator control unit configured to cause the actuator to generate the actuator torque in the counterclockwise direction as viewed in the vehicle-body-frame downward direction based on the bar-handle-rotation-moment change amount in a case where the bar-handle-rotation-moment change amount in the counterclockwise direction as viewed in the vehicle-body-frame downward direction is generated by the rider performing one operation of the right-grip-pushing-force increasing operation, the left-grip-pulling-force increasing operation, the right-grip-pulling-force reducing operation and the left-grip-pushing-force reducing operation, the actuator control unit being configured to cause the actuator to generate the actuator torque in the clockwise direction as viewed in the vehicle-body-frame downward direction based on the bar-handle-rotation-moment change amount in a case where the bar-handle-rotation-moment change amount in the clockwise direction as viewed in the vehicle-body-frame downward direction is generated by the rider performing one operation of the left-grip-pushing-force increasing operation, the right-grip-pulling-force increasing operation, the left-grip-pulling-force reducing operation, and the right-grip-pushing-force reducing operation.

The leaning vehicle of (1) can control a leaning posture by a bar handle in a manner which differs from a prior art technique. More specifically, in the leaning vehicle of (1), the posture of the leaning vehicle changes with the grip manipulation operation, such as the left-grip-pushing-force increasing operation, the right-grip-pulling-force increasing operation, the left-grip-pulling-force reducing operation, the right-grip-pushing-force reducing operation, the right-grip-pushing-force increasing operation, the left-grip-pulling-force increasing operation, the right-grip-pulling-force reducing operation, and the left-grip-pushing-force reducing operation. Accordingly, the bar-handle-input-operation acquiring unit determines based on a bar-handle-rotation-moment change amount that the grip manipulation operation is performed, such as the left-grip-pushing-force increasing operation, the right-grip-pulling-force increasing operation, the left-grip-pulling-force reducing operation, the right-grip-pushing-force reducing operation, the right-grip-pushing-force increasing operation, the left-grip-pulling-force increasing operation, the right-grip-pulling-force reducing operation, and the left-grip-pushing-force reducing operation. As described above, acquiring a bar-handle-rotation-moment change amount allows the bar-handle-input-operation acquiring unit to rapidly determine that the grip manipulation operation is performed.

Further, in the case where a bar-handle-rotation-moment change amount in the counterclockwise direction as viewed in the vehicle-body-frame downward direction is generated by a rider performing one operation of the right-grip-pushing-force increasing operation, the left-grip-pulling-force increasing operation, the right-grip-pulling-force reducing operation, and the left-grip-pushing-force reducing operation, the actuator control unit causes the actuator to generate an actuator torque in the counterclockwise direction as viewed in the vehicle-body-frame downward direction based on the bar-handle-rotation-moment change amount. With such an operation, the actuator can generate an actuator torque which follows the right-grip-pushing-force increasing operation, the left-grip-pulling-force increasing operation, the right-grip-pulling-force reducing operation, or the left-grip-pushing-force reducing operation performed by the rider. Further, in the case where a bar-handle-rotation-moment change amount in the clockwise direction as viewed in the vehicle-body-frame downward direction is generated by the rider performing one operation of the left-grip-pushing-force increasing operation, the right-grip-pulling-force increasing operation, the left-grip-pulling-force reducing operation, and the right-grip-pushing-force reducing operation, the actuator control unit causes the actuator to generate an actuator torque in the clockwise direction as viewed in the vehicle-body-frame downward direction based on the bar-handle-rotation-moment change amount. With such an operation, the actuator can generate an actuator torque which follows the left-grip-pushing-force increasing operation, the right-grip-pulling-force increasing operation, the left-grip-pulling-force reducing operation, or the right-grip-pushing-force reducing operation performed by the rider. As a result, according to the leaning vehicle of (1), it is possible to provide a leaning vehicle where a leaning posture is controlled by the bar handle in a manner which differs from a prior art technique.

A leaning vehicle of (2) is the leaning vehicle of (1), and the actuator control unit causes the actuator to generate the actuator torque based on the bar-handle rotation moment in a case where the bar-handle-rotation-moment change amount is zero, and the bar-handle rotation moment is generated.

In the leaning vehicle of (2), even when a bar-handle-rotation-moment change amount is zero, the actuator control unit can cause the actuator to generate an actuator torque of a proper magnitude. The case where a bar-handle-rotation-moment change amount is zero includes the case where the bar-handle-rotation-moment change amount is exactly zero and the case where the bar-handle-rotation-moment change amount is small to an extent that the bar-handle-rotation-moment change amount can be assumed as zero. A configuration may be adopted where an actuator torque based on bar-handle rotation moment is generated in the case where another condition is further satisfied in addition to the conditions where the bar-handle-rotation-moment change amount is zero and bar-handle rotation moment is not zero.

A leaning vehicle of (3) is the leaning vehicle of (1) or (2), in a case where a magnitude of the bar-handle rotation moment in the counterclockwise direction as viewed in the vehicle-body-frame downward direction decreases, and a magnitude of the bar-handle-rotation-moment change amount in the clockwise direction as viewed in the vehicle-body-frame downward direction increases, the actuator control unit causes a magnitude of the actuator torque in the clockwise direction as viewed in the vehicle-body-frame downward direction to increase, and in a case where a magnitude of the bar-handle rotation moment in the clockwise direction as viewed in the vehicle-body-frame downward direction decreases, and a magnitude of the bar-handle-rotation-moment change amount in the counterclockwise direction as viewed in the vehicle-body-frame downward direction increases, the actuator control unit causes a magnitude of the actuator torque in the counterclockwise direction as viewed in the vehicle-body-frame downward direction to increase.

A leaning vehicle of (4) is any one of the leaning vehicles of (1) to (3), in a case where the magnitude of the bar-handle rotation moment in the counterclockwise direction as viewed in the vehicle-body-frame downward direction increases, and the magnitude of the bar-handle-rotation-moment change amount in the counterclockwise direction as viewed in the vehicle-body-frame downward direction decreases, the actuator control unit causes the magnitude of the actuator torque in the counterclockwise direction as viewed in the vehicle-body-frame downward direction to reduce, and in a case where the magnitude of the bar-handle rotation moment in the clockwise direction as viewed in the vehicle-body-frame downward direction increases, and the magnitude of the bar-handle-rotation-moment change amount in the clockwise direction as viewed in the vehicle-body-frame downward direction decreases, the actuator control unit causes the magnitude of the actuator torque in the clockwise direction as viewed in the vehicle-body-frame downward direction to reduce.

A leaning vehicle of (5) is any one of the leaning vehicles of (1) to (4), the leaning vehicle further includes a vehicle velocity sensor configured to detect velocity of the leaning vehicle, and the actuator control unit causes the actuator to generate the actuator torque based on the bar-handle-rotation-moment change amount and the velocity of the leaning vehicle.

The leaning vehicle of (5) can cause, in two situations having the same bar-handle-rotation-moment change amount but different velocities, the actuator to generate an actuator torque of a magnitude suitable for each situation. For example, the entire velocity range of the leaning vehicle is divided into a low velocity range and a high velocity range. The high velocity range is a range where velocity is higher than that in the low velocity range. In this case, the leaning vehicle can cause an actuator torque in the low velocity range and an actuator torque in the high velocity range to differ from each other even when a bar-handlerotation-moment change amount in the low velocity range and a bar-handle-rotation-moment change amount in the high velocity range are equal to each other.

A leaning vehicle of (6) is any one of the leaning vehicles of (1) to (5), the leaning vehicle further includes a lean angle sensor configured to detect a lean angle of the vehicle body frame in the leaning-vehicle left-right direction, the actuator control unit causes the actuator to generate the actuator torque based on the bar-handle-rotation-moment change amount and the lean angle of the vehicle body frame in the leaning-vehicle left-right direction, and the leaning-vehicle left-right direction is a left-right direction of the leaning vehicle.

The leaning vehicle of (6) can cause, in two situations having the same bar-handle-rotation-moment change amount but different lean angles, the actuator to generate an actuator torque of a magnitude suitable for each situation. For example, a lean angle of the vehicle body frame in the leaning-vehicle left-right direction is divided into a large lean angle range and a small lean angle range. The large lean angle range is a range where the magnitude of the lean angle of the vehicle body frame in the leaning-vehicle left-right direction is larger than a threshold. The small lean angle range is a range where the magnitude of the lean angle of the vehicle body frame in the leaning-vehicle left-right direction is not more than the threshold. In this case, the leaning vehicle can cause an actuator torque in the small lean angle range and actuator torque in the large lean angle range to differ from each other even when a bar-handle-rotation-moment change amount in the small lean angle range and a bar-handle-rotation-moment change amount in the large lean angle range are equal to each other.

A leaning vehicle of (7) is any one of the leaning vehicles of (1) to (6), the leaning vehicle further includes a lean angular velocity sensor configured to detect an amount of change per unit time in the lean angle of the vehicle body frame in the leaning-vehicle left-right direction, the actuator control unit causes the actuator to generate the actuator torque based on the bar-handle-rotation-moment change amount and the amount of change per unit time in the lean angle of the vehicle body frame in the leaning-vehicle left-right direction, and the leaning-vehicle left-right direction is the left-right direction of the leaning vehicle.

The leaning vehicle of (7) can cause, in two situations having the same bar-handle-rotation-moment change amount but different amounts of change in lean angle per unit time, the actuator to generate an actuator torque of a magnitude suitable for each situation.

A leaning vehicle of (8) is any one of the leaning vehicles of (1) to (7), the leaning vehicle further includes a rider interface configured to receive, from the rider, an input relating to the actuator torque which the actuator generates, and the actuator control unit causes the actuator to generate the actuator torque based on the bar-handle-rotation-moment change amount and an output from the rider interface.

The actuator control unit of (8) can cause the actuator to generate an actuator torque of a different magnitude corresponding to a switching manipulation performed by a rider even with the same bar-handle rotation moment. With such a configuration, a rider can adjust the magnitude of an actuator torque generated by the actuator to a proper magnitude when the rider travels with luggage or a passenger mounted on the leaning vehicle, for example.

The foregoing and other purposes, features, aspects and advantages of the invention will become further apparent from the following detailed description of embodiments of the invention given with reference to the accompanying drawings.

As used in this specification, the term "and/or" includes any and all combinations of one or more of the associated listed items.

As used in this specification, the terms "including", "comprising" or "having" and variations thereof specify the presence of stated features, steps, operations, elements, components, and/or their equivalents, but do not preclude one or more of steps, operations, elements, components, and/or groups thereof.

Unless otherwise defined, all terms (including technical and scientific terms) used in this specification have the same meaning as commonly understood by one skilled in the art to which the present teaching belongs.

Terms, such as those defined in commonly used dictionaries, should be interpreted as having a meaning that is consistent with their meaning in the context of the relevant art and the present disclosure and will not be interpreted in an idealized or overly formal sense unless expressly so defined in this specification.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present teaching. It will be evident, however, to one skilled in the art that the present teaching may be practiced without these specific details. The present disclosure is to be considered as an exemplification of the present teaching, and is not intended to limit the present teaching to the specific embodiments illustrated by the figures or description below.

Advantageous Effects of Invention

According to the present teaching, a leaning posture of a leaning vehicle can be controlled by a bar handle based on a factor which differs from a steering ratio in a manner which differs from a prior art technique.

BRIEF DESCRIPTION OF DRAWINGS

FIG. 5 is a control table stored in a memory of an actuator control unit 61.

FIG. 12 is a function block diagram of the leaning vehicle 1a.

DESCRIPTION OF EMBODIMENTS

Embodiment

[Overall Configuration]

Figure 1:
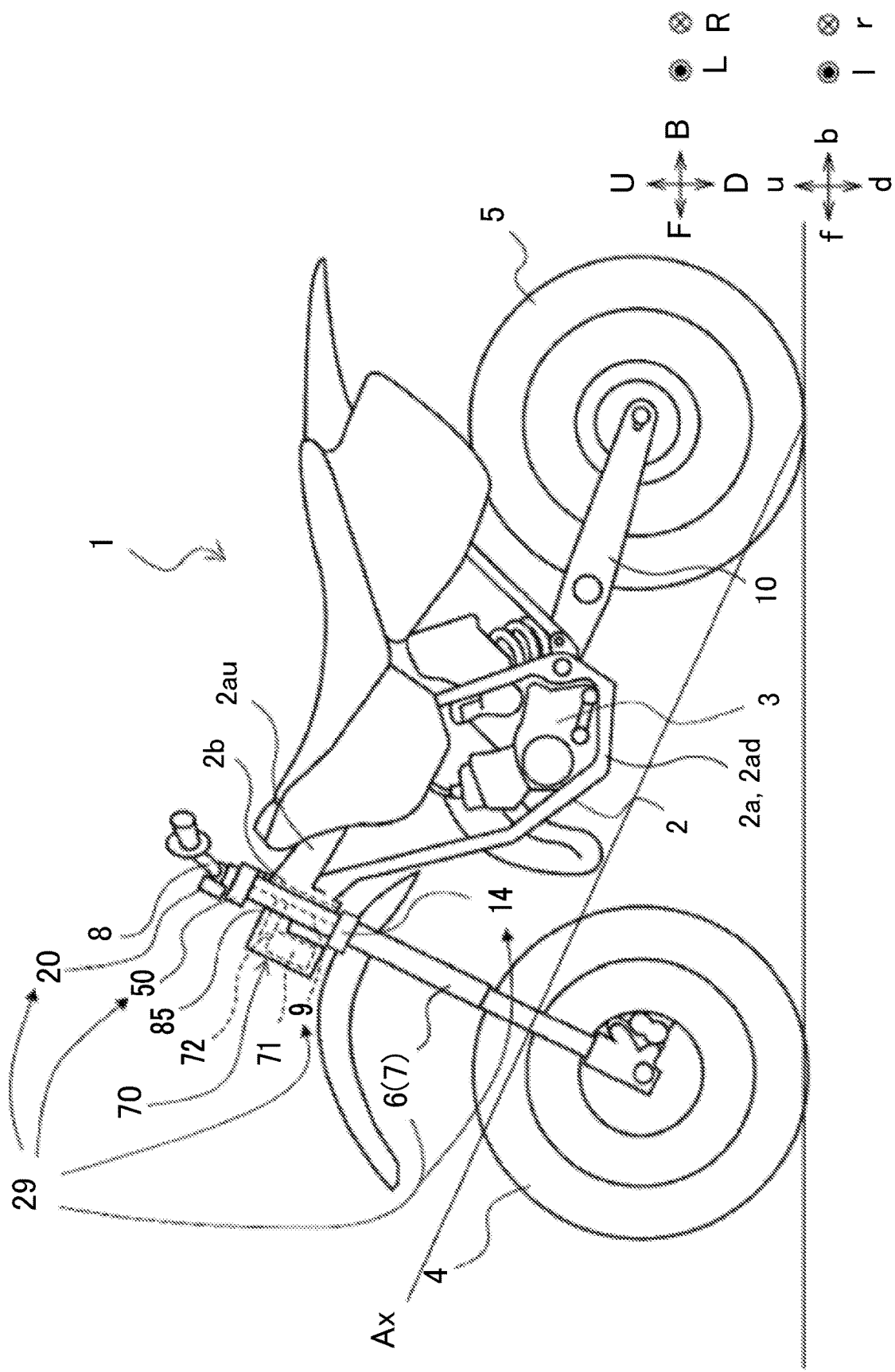
FIG. 1 is a view of a leaning vehicle 1 according to an embodiment of the present teaching as viewed in a rightward direction R.

Hereinafter, the overall configuration of a leaning vehicle 1 according to an embodiment of the present teaching will be described with reference to drawings. FIG. 1 is a view of the leaning vehicle 1 according to the embodiment of the present teaching as viewed in a rightward direction R.

Hereinafter, a frontward direction "F" (leaning-vehicle frontward direction) means a frontward direction in a leaning vehicle (1) front-rear direction. A rearward direction "B" (leaning-vehicle rearward direction) means a rearward direction in the leaning vehicle (1) front-rear direction. A leftward direction "L" (leaning-vehicle leftward direction) means a leftward direction in a leaning-vehicle (1) left-right direction. A rightward direction "R" (leaning-vehicle rightward direction) means a rightward direction in the leaning-vehicle (1) left-right direction. An upward direction "U" (leaning-vehicle upward direction) means an upward direction in a leaning-vehicle (1) up-down direction. A downward direction "D" (leaning-vehicle downward direction) means a downward direction in the leaning-vehicle (1) up-down direction. A front-rear direction "FB" (leaning-vehicle front-rear direction) means the leaning vehicle (1) front-rear direction. A left-right direction "LR" (leaning-vehicle left-right direction) means a leaning-vehicle left-right direction. An up-down direction "UD" (leaning-vehicle up-down direction) means the leaning-vehicle (1) up-down direction. The frontward direction "F" means a frontward direction when taking a rider who straddles the leaning vehicle 1 as a reference. The rearward direction "B" means a rearward direction when taking a rider who straddles the leaning vehicle 1 as a reference. The leftward direction "L" means a leftward direction when taking a rider who straddles the leaning vehicle 1 as a reference. The rightward direction "R" means a rightward direction when taking a rider who straddles the leaning vehicle 1 as a reference. The upward direction "U" means an upward direction when taking a rider who straddles the leaning vehicle 1 as a reference. The downward direction "D" means a downward direction when taking a rider who straddles the leaning vehicle 1 as a reference.

Further, in the leaning vehicle 1, a vehicle body frame 2 can lean in the leftward direction L or in the rightward direction R. In a case where the vehicle body frame 2 leans in the leftward direction L or in the rightward direction R, a vehicle-body-frame (2) up-down direction and a vehicle-body-frame (2) left-right direction do not match the up-down direction UD and the left-right direction LR, respectively. However, the vehicle-body-frame (2) up-down direction and the vehicle-body-frame (2) left-right direction in a state in which the vehicle body frame 2 is upright match the up-down direction UD and the left-right direction LR respectively. Hereinafter, a frontward direction "f" (vehicle-body-frame frontward direction) means a frontward direction in a vehicle-body-frame (2) front-rear direction. A rearward direction "b" (vehicle-body-frame rearward direction) means a rearward direction in the vehicle-body-frame (2) front-rear direction. A leftward direction "l" (vehicle-body-frame leftward direction) means a leftward direction in the vehicle-body-frame (2) left-right direction. A rightward direction "r" (vehicle-body-frame rightward direction) means a rightward direction in the vehicle-body-frame (2) left-right direction. An upward direction "u" (vehicle-body-frame upward direction) means an upward direction in the vehicle-body-frame (2) up-down direction. A downward direction "d" (vehicle-body-frame downward direction) means a downward direction in the vehicle-body-frame (2) up-down direction. A front-rear direction "fb" (vehicle-body-frame front-rear direction) means the vehicle-body-frame (2) front-rear direction. A left-right direction "lr" (vehicle-body-frame left-right direction) means the vehicle-body-frame (2) left-right direction. An up-down direction "ud" (vehicle-body-frame up-down direction) means the vehicle-body-frame (2) up-down direction.

In this specification, an axis or a member extending in the front-rear direction does not necessarily refer to only an axis or a member that is parallel to the front-rear direction. The axis or the member extending in the front-rear direction refers to an axis or a member that leans within a range of ±45° with respect to the front-rear direction. Similarly, an axis or a member extending in the up-down direction refers to an axis or a member that leans within a range of ±45° with respect to the up-down direction. An axis or a member extending in the left-right direction refers to an axis or a member that leans within a range of ±45° with respect to the left-right direction. Further, the term "state in which the vehicle body frame 2 is upright" means a state in which a steerable wheel is neither steering nor leaning with no rider riding on the leaning vehicle 1 and with no fuel being in the leaning vehicle 1.

In this specification, a state in which a first member is supported on a second member includes a state in which the first member is mounted on the second member in a non-movable manner with respect to the second member (that is, the first member is fixed to the second member), and a state in which the first member is mounted on the second member in a movable manner with respect to the second member. Further, a state in which the first member is supported on the second member includes both a state in which the first member is directly mounted on the second member and a state in which the first member is mounted on the second member via a third member.

In this specification, the first member and the second member arranged in the front-rear direction refer to the first member and the second member being in the following state.

When the first member and the second member are viewed in the direction perpendicular to the front-rear direction, both the first member and the second member are disposed on an arbitrary straight line indicating the front-rear direction. In this specification, the first member and the second member arranged in the front-rear direction as viewed in the up-down direction refers to the first member and the second member being in the following state. When the first member and the second member are viewed in the up-down direction, both the first member and the second member are disposed on an arbitrary straight line indicating the front-rear direction. In this case, when the first member and the second member are viewed in the left-right direction which differs from the up-down direction, either one of the first member or the second member may not be disposed on the arbitrary straight line indicating the front-rear direction. The first member and the second member may be in contact with each other. The first member and the second member may be separated from each other. The third member may be disposed between the first member and the second member. This definition is also applicable to other directions in addition to the front-rear direction.

In this specification, a state in which the first member is disposed further forward than the second member refers to the following state. The first member is disposed in front of a plane which passes through the front end of the second member, and which is orthogonal to the front-rear direction. In this case, the first member and the second member may or may not be arranged in the front-rear direction. This definition is also applicable to other directions in addition to the front-rear direction.

In this specification, a state in which the first member is disposed in front of the second member refers to the following state. At least a portion of the first member is disposed in a region where the second member passes when the second member performs parallel movement in the frontward direction. Accordingly, the first member may fall within the range where the second member passes when the second member performs parallel movement in the frontward direction, or the first member may protrude from the region where the second member passes when the second member performs parallel movement in the frontward direction. In this case, the first member and the second member are arranged in the front-rear direction. This definition is also applicable to other directions in addition to the front-rear direction.

In this specification, a state in which the first member is disposed in front of the second member as viewed in the left-right direction refers to the following state. The first member and the second member are arranged in the front-rear direction as viewed in the left-right direction, and a portion of the first member which faces the second member in an opposed manner is disposed in front of the second member as viewed in the left-right direction. In this definition, however, the first member and the second member may not be arranged in the front-rear direction three-dimensionally. This definition is also applicable to other directions in addition to the front-rear direction.

In this specification, unless otherwise specified, respective portions of the first member are defined as follows. The front portion of the first member means the front half of the first member. The rear portion of the first member means the rear half of the first member. The left portion of the first member means the left half of the first member. The right portion of the first member means the right half of the first member. The upper portion of the first member means the upper half of the first member. The lower portion of the first member means the lower half of the first member. The upper end of the first member means the end of the first member in the upward direction. The lower end of the first member means the end of the first member in the downward direction. The front end of the first member means the end of the first member in the frontward direction. The rear end of the first member means the end of the first member in the rearward direction. The right end of the first member means the end of the first member in the rightward direction. The left end of the first member means the end of the first member in the leftward direction. The upper end portion of the first member means the upper end and an area in the vicinity of the upper end of the first member. The lower end portion of the first member means the lower end and an area in the vicinity of the lower end of the first member. The front end portion of the first member means the front end and an area in the vicinity of the front end of the first member. The rear end portion of the first member means the rear end and an area in the vicinity of the rear end of the first member. The right end portion of the first member means the right end and an area in the vicinity of the right end of the first member. The left end portion of the first member means the left end and an area in the vicinity of the left end of the first member. The first member means a member forming the leaning vehicle 1.

In this specification, the magnitude of parameter (bar-handle rotation moment M or bar-handle-rotation-moment change amount M') means the absolute value of the parameter. In this specification, an increase in magnitude of parameter means an increase in a parameter having a positive value or a reduction in a parameter having a negative value. In this specification, an increase in a parameter having a positive value may be also referred to as an increase in magnitude of parameter having a positive value. Further, a reduction in a parameter having a negative value may be also referred to as an increase in magnitude of parameter having a negative value. A reduction in magnitude of parameter means a reduction in a parameter having a positive value or an increase in a parameter having a negative value. In this specification, a reduction in a parameter having a positive value may be also referred to as a reduction in magnitude of parameter having a positive value. Further, an increase in a parameter having a negative value may be also referred to as a reduction in magnitude of parameter having a negative value.

As shown in FIG. 1, the leaning vehicle 1 includes the vehicle body frame 2, a drive source 3, a steerable wheel 4, a drive wheel 5, a bar handle 8, a swing arm 10, and a steering mechanism 29. The vehicle body frame 2 leans in the leftward direction L at the time of turning of the leaning vehicle 1 in the leftward direction L. The vehicle body frame 2 leans in the rightward direction R at the time of turning of the leaning vehicle 1 in the rightward direction R. The vehicle body frame 2 leans in the leftward direction L or in the rightward direction R by rotating about a roll axis Ax. The roll axis Ax is an axis which extends in the front-rear direction FB. While the roll axis Ax includes both a front-rear direction FB component and an up-down direction UD component, the front-rear direction FB component is predominant. More specifically, as shown in FIG. 1, the roll axis Ax is a straight line which passes through a point where the drive wheel 5 is in contact with a ground surface when the vehicle body frame 2 is in an upright state, and which is orthogonal to the center axis of a steering shaft 9. As viewed in the rearward direction b, the roll axis Ax is positioned at the center of the vehicle body frame 2 in an upright state in the left-right direction lr.

The vehicle body frame 2 includes a main frame 2a and a head pipe 2b. The main frame 2a has a structure where a plurality of pipes are connected with each other. The main frame 2a includes a main-frame upper portion 2au and a main-frame lower portion 2ad. The main-frame upper portion 2au extends in the front-rear direction fb as viewed in the downward direction d. The main-frame lower portion 2ad is disposed below the main-frame upper portion 2au in the downward direction d. The main-frame lower portion 2ad has a U shape as viewed in the rightward direction r or in the leftward direction l. Both ends of the main-frame lower portion 2ad are connected to the main-frame upper portion 2au. With such a configuration, the main-frame upper portion 2au and the main-frame lower portion 2ad has an annular shape as viewed in the leftward direction 1 or from the rightward direction r.

The head pipe 2b is fixed to the front end of the main-frame upper portion 2au. The head pipe 2b has a cylindrical shape which extends in the up-down direction ud. When the head pipe 2b is viewed in the rightward direction r or in the leftward direction 1, the upper end of the head pipe 2b is positioned behind the lower end of the head pipe 2b in the rearward direction b. With such a configuration, the center axis of the head pipe 2b slightly leans in the rearward direction b with respect to the up-down direction ud.

Figure 2:
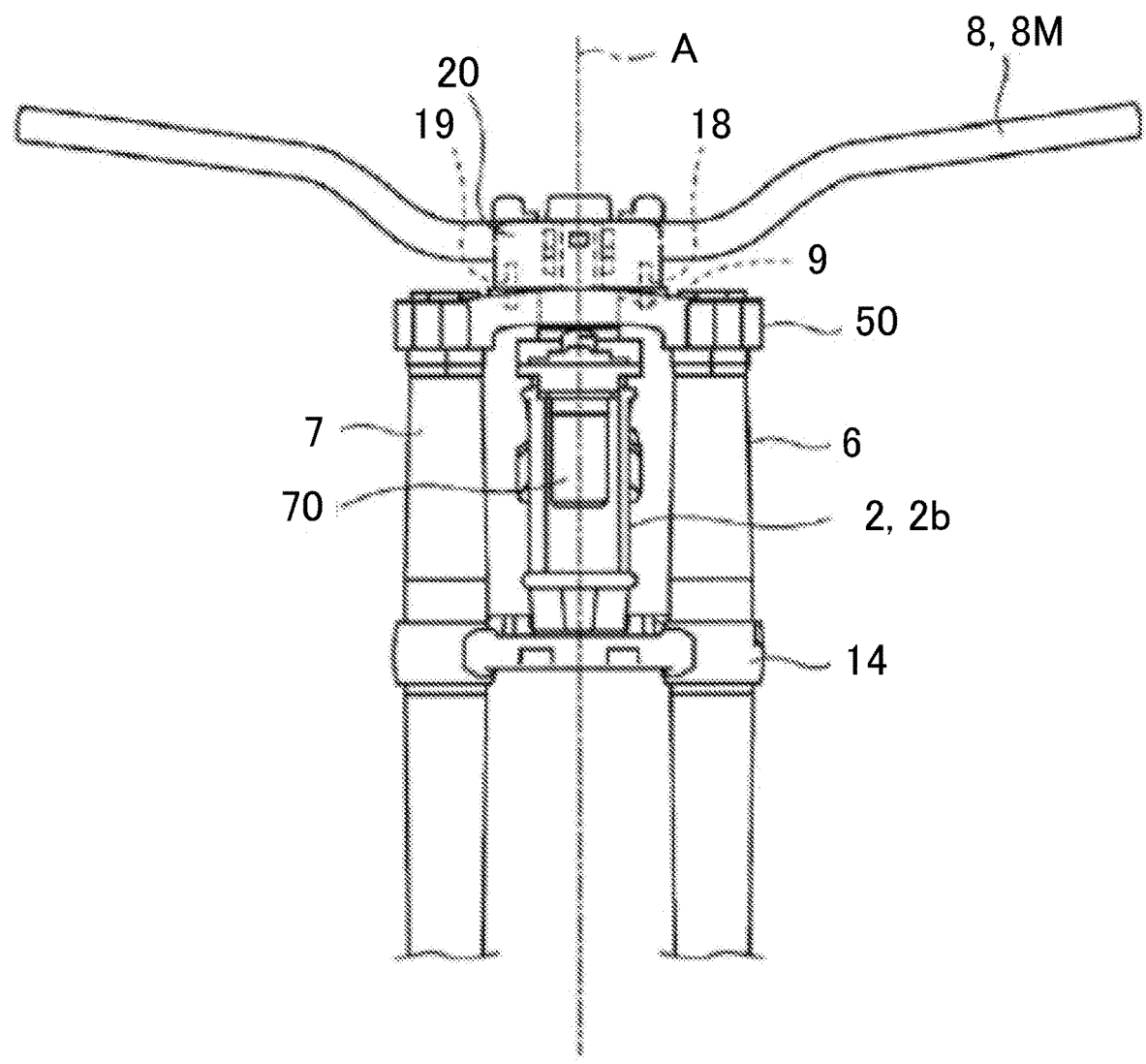
FIG. 2 is a view of a bar handle 8 of the leaning vehicle 1 and an area in the vicinity of the bar handle 8 as viewed in a rearward direction B.
Figure 2:
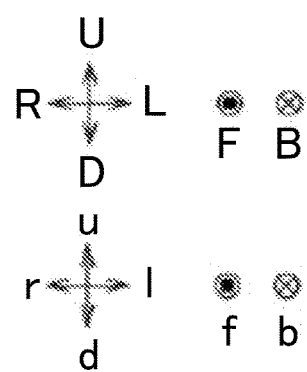
Figure 3:
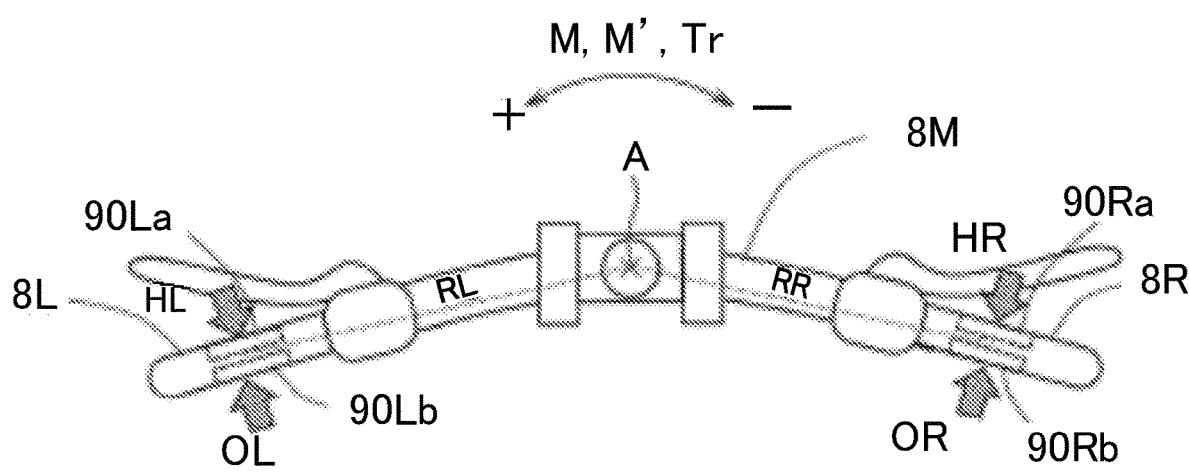
FIG. 3 is a view of the bar handle 8 of the leaning vehicle 1 as viewed in a downward direction D.
Figure 3:
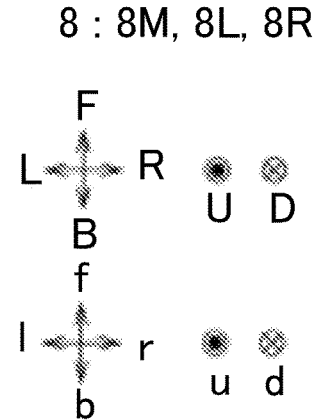

Next, the bar handle 8 and the steering mechanism 29 will be described with reference to drawings. FIG. 2 is a view of the bar handle 8 of the leaning vehicle 1 and an area in the vicinity of the bar handle 8 as viewed in the rearward direction B. FIG. 3 is a view of the bar handle 8 of the leaning vehicle 1 as viewed in the downward direction D.

As shown in FIG. 2, the bar handle 8 is supported on the vehicle body frame 2 (more accurately, the head pipe 2b) such that the bar handle 8 is allowed to rotate about an axis A extending in the up-down direction ud. The axis A is aligned with the center axis of the head pipe 2b. The movable range of the bar handle 8 is 180 degrees (half rotation) or less. This movable range is set to a difference (lock to lock) between a steering angle at the time when the bar handle 8 is manipulated to the maximum in the leftward direction L and a steering angle at the time when the bar handle 8 is manipulated to the maximum in the rightward direction R.

As shown in FIG. 3, the bar handle 8 includes a bar handle body 8M, a left grip 8L, and a right grip 8R. The bar handle body 8M is a rod-shaped member which extends in the left-right direction LR when he leaning vehicle 1 is in an upright state. The left end portion and right end portion of the bar handle body 8M are disposed further upward in the upward direction U and further rearward in the rearward direction B than the center of the bar handle body 8M.

The left grip 8L is disposed further leftward in the leftward direction 1 than the center of the vehicle body frame 2 in the left-right direction lr. Specifically, the left grip 8L has a cylindrical shape. The left end of the bar handle body 8M is inserted into the left grip 8L. The left grip 8L is held by the left hand of a rider. The right grip 8R is disposed further rightward in the rightward direction r than the center of the vehicle body frame 2 in the left-right direction lr. Specifically, the right grip 8R has a cylindrical shape. The right end of the bar handle body 8M is inserted into the right grip 8R. The right grip 8R is held by the right hand of a rider.

As shown in FIG. 2, the steering mechanism 29 is supported on the head pipe 2b of the vehicle body frame 2. The steering mechanism 29 includes a transmission member 20, a top bridge 50, a bottom bridge 14, a left shock absorber 6, a right shock absorber 7, and the steering shaft 9.

The steering shaft 9 extends in the up-down direction ud. The steering shaft 9 penetrates the head pipe 2b in the up-down direction ud. With such a configuration, the steering shaft 9 is supported on the head pipe 2b such that the steering shaft 9 is allowed to rotate about the axis A. The top bridge 50 is fixed to the upper portion of the steering shaft 9. The top bridge 50 is a plate-shaped member which extends in the left-right direction LR when the leaning vehicle 1 is in an upright state. The bottom bridge 14 is fixed to the lower end portion of the steering shaft 9. The bottom bridge 14 is a plate-shaped member which extends in the left-right direction LR when the leaning vehicle 1 is in an upright state. The top bridge 50 and the bottom bridge 14 are fixed to the steering shaft 9, thus being allowed to rotate about the axis A as an integral body with the steering shaft 9.

The left shock absorber 6 extends in the up-down direction ud. The left shock absorber 6 is disposed to the left of the steering shaft 9 in the leftward direction L when the leaning vehicle 1 is in an upright state. The left shock absorber 6 is fixed to the left portion of the top bridge 50 and to the left portion of the bottom bridge 14. Further, the left shock absorber 6 extends in the downward direction d from the left portion of the top bridge 50 and from the left portion of the bottom bridge 14. The left shock absorber 6 is a combination of a spring and a damper, and can extend and contract in the up-down direction ud. The right shock absorber 7 extends in the up-down direction ud. The right shock absorber 7 is disposed to the right of the steering shaft 9 in the rightward direction R when the leaning vehicle 1 is in an upright state. The right shock absorber 7 is fixed to the right portion of the top bridge 50 and to the right portion of the bottom bridge 14. Further, the right shock absorber 7 extends in the downward direction d from the right portion of the top bridge 50 and from the right portion of the bottom bridge 14. The right shock absorber 7 is a combination of a spring and a damper, and can extend and contract in the up-down direction ud. The left shock absorber 6 and the right shock absorber 7 are fixed to the top bridge 50 and to the bottom bridge 14, thus being allowed to rotate about the axis A as an integral body with the steering shaft 9.

The transmission member 20 is fixed to the upper surface of the top bridge 50. The transmission member 20 holds the center of the bar handle body 8M in the left-right direction LR. With such a configuration, the bar handle 8 is fixed to the upper end of the steering shaft 9. Accordingly, the bar handle 8 is allowed to rotate about the axis A as an integral body with the steering mechanism 29.

As shown in FIG. 1, the steerable wheel 4 is supported on the vehicle body frame 2 such that the steerable wheel 4 is allowed to rotate about an axle. More specifically, the axle connects the lower end portion of the left shock absorber 6 and the lower end portion of the right shock absorber 7 with each other. The axle penetrates the center of the steerable wheel 4 in the left-right direction LR when the leaning vehicle 1 is in an upright state. With such a configuration, the steerable wheel 4 is supported on the vehicle body frame 2 via the steering mechanism 29. Accordingly, the steerable wheel 4 is allowed to rotate about the axis A as an integral body with the bar handle 8 and the steering mechanism 29. When a rider rotates the bar handle 8 in the counterclockwise direction as viewed in the downward direction d, the steerable wheel 4 is rotated in the counterclockwise direction. With such an operation, the steerable wheel 4 is steered in the leftward direction L. When a rider rotates the bar handle 8 in the clockwise direction as viewed in the downward direction d, the steerable wheel 4 is steered in the clockwise direction. With such an operation, the steerable wheel 4 is steered in the rightward direction R. Further, with the extension and contraction of the left shock absorber 6 and the right shock absorber 7, the steerable wheel 4 can move in the up-down direction.

As shown in FIG. 1, the swing arm 10 extends in the rearward direction b from the lower portion of the main-frame lower portion 2ad. The swing arm 10 is supported on the main-frame lower portion 2ad such that the swing arm 10 is allowed to rotate about a shaft which extends in the left-right direction lr. With such a configuration, the rear end portion of the swing arm 10 can move in the up-down direction.

As shown in FIG. 1, the drive wheel 5 is supported on the rear end portion of the swing arm 10 such that the drive wheel 5 is allowed to rotate about an axle. The axle is disposed at the rear end portion of the swing arm 10. The axle penetrates the center of the drive wheel 5 in the left-right direction lr. The rear end portion of the swing arm 10 can move in the up-down direction so that the drive wheel 5 can also move in the up-down direction.

As shown in FIG. 1, the drive source 3 generates a driving force which causes the drive wheel 5 to rotate. The drive source 3 may be an engine, an electric motor or the like. The drive source 3 is supported on the vehicle body frame 2. More specifically, the drive source 3 is disposed in a space surrounded by the main-frame upper portion 2au and the main-frame lower portion 2ad as viewed in the rightward direction r or in the leftward direction l. With such a configuration, the drive source 3 is fixed to the vehicle body frame 2. A driving force generated by the drive source 3 is transmitted to the drive wheel 5 via a transmission mechanism, such as a transmission. With such transmission, the drive wheel 5 is rotated by the driving force generated by the drive source 3.

[Actuator Control Unit, Actuator and Bar-Handle-Input-Operation Acquiring Unit]

Figure 4:
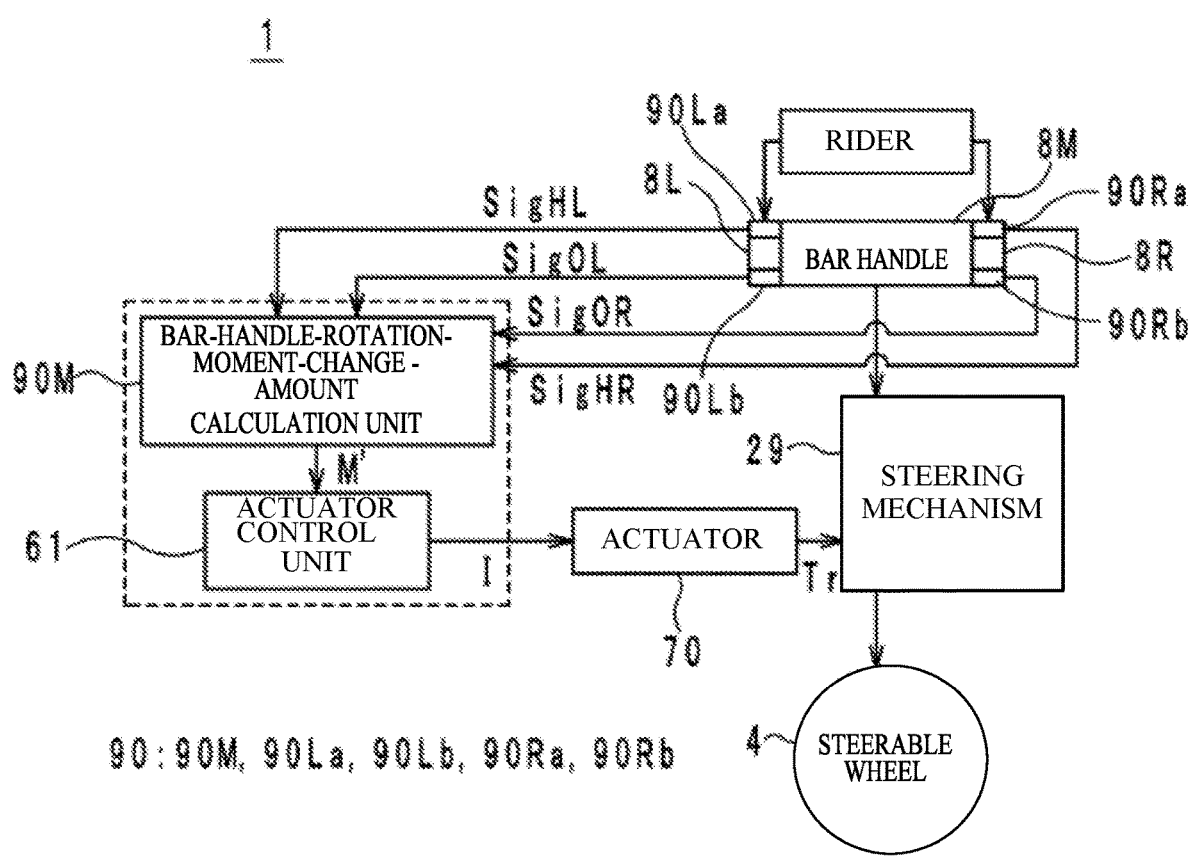
FIG. 4 is a function block diagram of the leaning vehicle 1.

An actuator control unit 61, an actuator 70, and a bar-handle-input-operation acquiring unit 90 will be described with reference to drawings. FIG. 4 is a function block diagram of the leaning vehicle 1.

As shown in FIG. 4, the leaning vehicle 1 further includes the actuator control unit 61, the actuator 70, and the bar-handle-input-operation acquiring unit 90. The actuator 70 generates an actuator torque Tr which causes the bar handle 8 to rotate in the counterclockwise direction or in the clockwise direction as viewed in the downward direction d. That is, the actuator 70 generates an actuator torque Tr which steers the steerable wheel 4 in the leftward direction L or in the rightward direction R. The actuator torque Tr takes a positive value when the bar handle 8 is rotated in the counterclockwise direction (when the steerable wheel 4 is steered in the leftward direction L) as viewed in the downward direction d. Hereinafter, the actuator torque Tr having a positive value is also referred to as "actuator torque Tr in the counterclockwise direction". The actuator torque Tr takes a negative value when the bar handle 8 is rotated in the clockwise direction (when the steerable wheel 4 is steered in the rightward direction R) as viewed in the downward direction d. Hereinafter, the actuator torque Tr having a negative value is also referred to as "actuator torque Tr in the clockwise direction".

As shown in FIG. 1, the actuator 70 includes an actuator body 71, a speed reducer 72, and a mounting part 85. The actuator body 71 is disposed in front of the head pipe 2b in the frontward direction f. In one embodiment, the actuator body 71 is an electric motor. The actuator body 71 generates a torque with the supply of power. The speed reducer 72 reduces the speed of rotation of the rotary shaft of the actuator body 71, and transmits the rotation to the steering shaft 9. With such a configuration, the speed reducer 72 converts the torque, which is generated by the actuator body 71, into an actuator torque Tr, and applies the actuator torque Tr to the steering shaft 9. The mounting part 85 is a casing which houses the actuator body 71 and the speed reducer 72. The mounting part 85 fixes the actuator body 71 and the speed reducer 72 to the head pipe 2b.

The bar-handle-input-operation acquiring unit 90 acquires a bar-handle-rotation-moment change amount M' which is generated by a rider performing at least one of eight kinds of grip manipulation operation. The eight kinds of grip manipulation operation are a left-grip-pushing-force increasing operation, a right-grip-pulling-force increasing operation, a left-grip-pulling-force reducing operation, a right-grip-pushing-force reducing operation, a right-grip-pushing-force increasing operation, a left-grip-pulling-force increasing operation, a right-grip-pulling-force reducing operation, and a left-grip-pushing-force reducing operation.

Left-grip-pushing-force increasing operation: an operation where a rider increases a pushing force OL which pushes the left grip 8L in the frontward direction F (see FIG. 3, hereinafter also referred to as "left-grip pushing force OL")

Right-grip-pulling-force increasing operation: an operation where a rider increases a pulling force HR which pulls the right grip 8R in the rearward direction B (see FIG. 3, hereinafter also referred to as "right-grip pulling force HR")

Left-grip-pulling-force reducing operation: an operation where a rider reduces a pulling force HL which pulls the left grip 8L in the rearward direction B (see FIG. 3, hereinafter also referred to as "left-grip pulling force HL")

Right-grip-pushing-force reducing operation: an operation where a rider reduces a pushing force OR which pushes the right grip 8R in the frontward direction F (see FIG. 3, hereinafter also referred to as "right-grip pushing force OR")

Right-grip-pushing-force increasing operation: an operation where a rider increases a pushing force OR which pushes the right grip 8R in the frontward direction F Left-grip-pulling-force increasing operation: an operation where a rider increases a pulling force HL which pulls the left grip 8L in the rearward direction B Right-grip-pulling-force reducing operation: an operation where a rider reduces a pulling force HR which pulls the right grip 8R in the rearward direction B Left-grip-pushing-force reducing operation: an operation where a rider reduces a pushing force OL which pushes the left grip 8L in the frontward direction F In this specification, to increase a force includes both of a case where a rider increases a force to be applied to a grip in a state where a force is applied to the grip by the rider and a case where a rider applies a force to a grip in a state where a force is not applied to the grip by the rider.

Bar-handle rotation moment M is moment which causes the bar handle 8 to rotate in the counterclockwise direction or in the clockwise direction as viewed in the downward direction d. The bar-handle rotation moment M takes a positive value when the bar handle 8 is rotated in the counterclockwise direction (when the steerable wheel 4 is steered in the leftward direction L) as viewed in the downward direction d. Hereinafter, the bar-handle rotation moment M having a positive value is also referred to as "bar-handle rotation moment M in the counterclockwise direction". The bar-handle rotation moment M takes a negative value when the bar handle 8 is rotated in the clockwise direction (when the steerable wheel 4 is steered in the rightward direction R) as viewed in the downward direction d. Hereinafter, the bar-handle rotation moment M having a negative value is also referred to as "bar-handle rotation moment M in the clockwise direction".

A bar-handle-rotation-moment change amount M' is an amount of change in bar-handle rotation moment M per unit time. The bar-handle-rotation-moment change amount M' is a value acquired by time-differentiating bar-handle rotation moment M. The bar-handle-rotation-moment change amount M' takes a positive value with an increase in magnitude of bar-handle rotation moment M which causes the bar handle 8 to rotate in the counterclockwise direction as viewed in the downward direction d, and with a reduction in magnitude of bar-handle rotation moment M which causes the bar handle 8 to rotate in the clockwise direction as viewed in the downward direction d. Hereinafter, the bar-handle-rotation-moment change amount M' having a positive value is also referred to as "bar-handle-rotation-moment change amount M' in the counterclockwise direction". Further, the bar-handle-rotation-moment change amount M' takes a negative value with an increase in magnitude of bar-handle rotation moment M which causes the bar handle 8 to rotate in the clockwise direction as viewed in the downward direction d, and with a reduction in magnitude of bar-handle rotation moment M which causes the bar handle 8 to rotate in the counterclockwise direction as viewed in the downward direction d. Hereinafter, the bar-handle-rotation-moment change amount M' having a negative value is also referred to as "bar-handle-rotation-moment change amount M' in the clockwise direction".

Hereinafter, the configuration of the bar-handle-input-operation acquiring unit 90 will be described with reference to drawings. As shown in FIG. 4, the bar-handle-input-operation acquiring unit 90 includes a left-front pressure sensor 90La, a left-rear pressure sensor 90Lb, a right-front pressure sensor 90Ra, a right-rear pressure sensor 90Rb, and a bar-handle-rotation-moment-change-amount calculation unit 90M.

The left-front pressure sensor 90La, the left-rear pressure sensor 90Lb, the right-front pressure sensor 90Ra, and the right-rear pressure sensor 90Rb detect a pressure applied to the surface of the left grip 8L and the surface of the right grip 8R. Specifically, as shown in FIG. 3, the left-front pressure sensor 90La detects a left-grip pulling force HL, and outputs a left-front pressure sensor signal SigHL having a voltage which corresponds to the left-grip pulling force HL (see FIG. 4). As shown in FIG. 3, the left-rear pressure sensor 90Lb detects a left-grip pushing force OL, and outputs a left-rear pressure sensor signal SigOL having a voltage which corresponds to the left-grip pushing force OL (see FIG. 4). As shown in FIG. 3, the right-front pressure sensor 90Ra detects a right-grip pulling force HR, and outputs a right-front pressure sensor signal SigHR having a voltage which corresponds to the right-grip pulling force HR (see FIG. 4). As shown in FIG. 3, the right-rear pressure sensor 90Rb detects a right-grip pushing force OR, and outputs a right-rear pressure sensor signal SigOR having a voltage which corresponds to the right-grip pushing force OR (see FIG. 4).

The above-mentioned left-front pressure sensor 90La, left-rear pressure sensor 90Lb, right-front pressure sensor 90Ra, and right-rear pressure sensor 90Rb have the structures which will be described hereinafter, for example. Hereinafter, the description is made by taking the left-front pressure sensor 90La as an example. The left-front pressure sensor 90La includes a piezoelectric element and two electrodes. The piezoelectric element has a surface shape. The piezoelectric element is disposed between the inner peripheral surface of the left grip 8L having a cylindrical shape and the left end portion of the bar handle body 8M. The two electrodes are provided to both surfaces of the piezoelectric element. When a left-grip pulling force HL is applied to the left-front pressure sensor 90La, a voltage which corresponds to the magnitude of the left-grip pulling force HL is generated between the two electrodes. With such generation of the voltage, the left-front pressure sensor 90La outputs a left-front pressure sensor signal SigHL. The structures of the left-rear pressure sensor 90Lb, the right-front pressure sensor 90Ra, and the right-rear pressure sensor 90Rb are equal to the structure of the left-front pressure sensor 90La and hence, the description of such structures is omitted.

The bar-handle-rotation-moment-change-amount calculation unit 90M acquires a bar-handle-rotation-moment change amount M' based on a left-front pressure sensor signal SigHL, a left-rear pressure sensor signal SigOL, a right-front pressure sensor signal SigHR, and a right-rear pressure sensor signal SigOR. The bar-handle-rotation-moment-change-amount calculation unit 90M is an ECU (electric control unit) which is a combination of an IC (integrated circuit), an electronic component, and a printed circuit board, for example. Hereinafter, the description will be made with reference to FIG. 3 in more detail.

A distance from the axis A to the center of the left-front pressure sensor 90La and to the center of the left-rear pressure sensor 90Lb is defined as "RL". The center of the left-front pressure sensor 90La is the center of the left-front pressure sensor 90La in the left-right direction LR, and the center of the left-rear pressure sensor 90Lb is the center of the left-rear pressure sensor 90Lb in the left-right direction LR. A distance from the axis A to the center of the right-front pressure sensor 90Ra and to the center of the right-rear pressure sensor 90Rb is defined as "RR". The center of the right-front pressure sensor 90Ra is the center of the right-front pressure sensor 90Ra in the left-right direction LR, and the center of the right-rear pressure sensor 90Rb is the center of the right-rear pressure sensor 90Rb in the left-right direction LR. Under such conditions, bar-handle rotation moment M is expressed by a formula (1).

$$M = (HL - OL) \times RL + (OR - HR) \times RR \quad (1)$$

Bar-handle rotation moment M takes a positive value when the bar handle 8 is rotated in the counterclockwise direction as viewed in the downward direction d. Bar-handle rotation moment M takes a negative value when the bar handle 8 is rotated in the clockwise direction as viewed in the downward direction d. The bar-handle-rotation-moment-change-amount calculation unit 90M calculates bar-handle rotation moment M using the formula (1) based on a left-front pressure sensor signal SigHL, a left-rear pressure sensor signal SigOL, a right-front pressure sensor signal SigHR, and a right-rear pressure sensor signal SigOR.

The case is considered where each of the vector of a left-grip pulling force HL, the vector of a left-grip pushing force OL, the vector of a right-grip pulling force HR, and the vector of a right-grip pushing force OR is not perpendicular to a line which connects the axis A and the point of action of each force. In this case, it is sufficient to correct the left-grip pulling force HL, the left-grip pushing force OL, the right-grip pulling force HR, and the right-grip pushing force OR using the trigonometric functions, for example. With such a correction, the bar-handle-rotation-moment-change-amount calculation unit 90M can calculate components of the left-grip pulling force HL, the left-grip pushing force OL, the right-grip pulling force HR, and the right-grip pushing force OR which contribute to bar-handle rotation moment M.

The bar-handle-rotation-moment-change-amount calculation unit 90M calculates a bar-handle-rotation-moment change amount M' by time-differentiating bar-handle rotation moment M. Alternatively, the bar-handle-rotation-moment-change-amount calculation unit 90M may calculate a bar-handle-rotation-moment change amount M' by a method which will be described hereinafter. The bar-handle-rotation-moment-change-amount calculation unit 90M acquires a left-front pressure sensor signal SigHL, a left-rear pressure sensor signal SigOL, a right-front pressure sensor signal SigHR, and a right-rear pressure sensor signal SigOR once in every time period Δt. In this case, the bar-handle-rotation-moment-change-amount calculation unit 90M calculates a bar-handle rotation moment M once in every time period Δt. Bar-handle rotation moment M which is calculated by the bar-handle-rotation-moment-change-amount calculation unit 90M at a point of time t1 is assumed as M(t1). Bar-handle rotation moment M which is calculated by the bar-handle-rotation-moment-change-amount calculation unit 90M at a point of time t2 is assumed as M(t2). Further, a bar-handle-rotation-moment change amount M' at the point of time t2 is assumed as M'(t2). A difference between the point of time t2 and the point of time t1 is Δt. Under such conditions, the bar-handle-rotation-moment-change-amount calculation unit 90M can calculate a bar-handle-rotation-moment change amount M'(t2) using the following formula (2).

$$M'(t2)=\{M(t2)-M(t1)\}/\Delta t \quad (2)$$

The actuator control unit 61 controls the actuator 70 based on bar-handle-rotation-moment change amount M'. The actuator control unit 61 is an ECU which is a combination of an IC, an electronic component, and a printed circuit board, for example. The actuator control unit 61 may be configured of one ECU while sharing the one ECU with the bar-handle-rotation-moment-change-amount calculation unit 90M. Alternatively, the ECU of the actuator control unit 61 and the ECU of the bar-handle-rotation-moment-change-amount calculation unit 90M may be different ECUs.

When a rider performs a right-grip-pushing-force increasing operation or a left-grip-pulling-force increasing operation, the magnitude of bar-handle rotation moment M in the counterclockwise direction increases. Accordingly, a bar-handle-rotation-moment change amount M' in the counterclockwise direction (bar-handle-rotation-moment change amount M' having a positive value) is generated. At this point of operation, the actuator control unit 61 causes the actuator 70 to generate an actuator torque Tr in the counterclockwise direction (actuator torque Tr having a positive value) based on the bar-handle-rotation-moment change amount M'.

When a rider performs a right-grip-pulling-force reducing operation or a left-grip-pushing-force reducing operation, the magnitude of bar-handle rotation moment M in the clockwise direction decreases. Accordingly, a bar-handle-rotation-moment change amount M' in the counterclockwise direction (bar-handle-rotation-moment change amount M' having a positive value) is generated. At this point of operation, the actuator control unit 61 causes the actuator 70 to generate an actuator torque Tr in the counterclockwise direction (actuator torque Tr having a positive value) based on the bar-handle-rotation-moment change amount M'.

As described above, in the case where a bar-handle-rotation-moment change amount M' in the counterclockwise direction (bar-handle-rotation-moment change amount M' having a positive value) is generated by a rider performing one operation of the right-grip-pushing-force increasing operation, the left-grip-pulling-force increasing operation, the right-grip-pulling-force reducing operation, and the left-grip-pushing-force reducing operation, the actuator control unit 61 causes the actuator 70 to generate an actuator torque Tr in the counterclockwise direction (actuator torque Tr having a positive value) based on the bar-handle-rotation-moment change amount M'. With such generation, the steerable wheel 4 is steered in the leftward direction L.

When a rider performs a left-grip-pushing-force increasing operation or a right-grip-pulling-force increasing operation, the magnitude of bar-handle rotation moment M in the clockwise direction increases. Accordingly, a bar-handle-rotation-moment change amount M' in the clockwise direction (bar-handle-rotation-moment change amount M' having a negative value) is generated. At this point of operation, the actuator control unit 61 causes the actuator 70 to generate an actuator torque Tr in the clockwise direction (actuator torque Tr having a negative value) based on the bar-handle-rotation-moment change amount M'.

When a rider performs a left-grip-pulling-force reducing operation or a right-grip-pushing-force reducing operation, the magnitude of bar-handle rotation moment M in the counterclockwise direction decreases. Accordingly, a bar-handle-rotation-moment change amount M' in the clockwise direction (bar-handle-rotation-moment change amount M' having a negative value) is generated. At this point of operation, the actuator control unit 61 causes the actuator 70 to generate an actuator torque Tr in the clockwise direction (actuator torque Tr having a negative value) based on the bar-handle-rotation-moment change amount M'.

As described above, in the case where a bar-handle-rotation-moment change amount M' in the clockwise direction (bar-handle-rotation-moment change amount M' having a negative value) is generated by a rider performing one operation of the left-grip-pushing-force increasing operation, the right-grip-pulling-force increasing operation, the left-grip-pulling-force reducing operation, and the right-grip-pushing-force reducing operation, the actuator control unit 61 causes the actuator 70 to generate an actuator torque Tr in the clockwise direction (actuator torque Tr having a negative value) based on the bar-handle-rotation-moment change amount M'. With such generation, the steerable wheel 4 is steered in the rightward direction R.

The operations of the actuator control unit 61 which causes the actuator 70 to generate an actuator torque Tr based on a bar-handle-rotation-moment change amount M' will be described in more detail. FIG. 5 is a control table stored in the memory of the actuator control unit 61. The control table shows the relationship between a bar-handle-rotation-moment change amount M' and a control current I, and the relationship between a bar-handle-rotation-moment change amount M' and an actuator torque Tr. Each of M'(−3), M'(−2), M'(−1), 0, M'(1), M'(2), and M'(3) means the value of a bar-handle-rotation-moment change amount M'. Each of I(−3), I(−2), I(−1), 0, 41), I(2), and I(3) means the value of a control current I. Each of Tr(−3), Tr(−2), Tr(−1), 0, Tr(1), Tr(2), and Tr(3) means the value of an actuator torque Tr. Further, each value has the following magnitude relationship.

. . . <M'(−3)<M'(−2)<M'(−1)<0<M'(1)<M'(2)<M'(3)< . . .

. . . <I(−3)<I(−2)<I(−1)<0<I(1)<I(2)<I(3)< . . .

. . . <Tr(−3)<Tr(−2)<Tr(−1)<0<Tr(1)<Tr(2)<Tr(3)< . . .

I>0: a control current I for causing the actuator 70 to generate an actuator torque Tr in the counterclockwise direction (actuator torque Tr having a positive value)

I<0: a control current I for causing the actuator 70 to generate an actuator torque Tr in the clockwise direction (actuator torque Tr having a negative value)

The actuator control unit 61 decides, based on the control table, a control current I which corresponds to a bar-handle-rotation-moment change amount M' calculated by the bar-handle-rotation-moment-change-amount calculation unit 90M. Further, the actuator control unit 61 supplies the control current I to the actuator 70. With such operations, the actuator 70 generates an actuator torque Tr. For example, when the bar-handle-rotation-moment change amount M' is M'(1), the actuator control unit 61 decides I(1) for a control current I. The actuator control unit 61 supplies the control current I of I(1) to the actuator 70. With such operations, the actuator 70 outputs the actuator torque Tr of Tr(1). It is sufficient that the control table includes the relationship between a bar-handle-rotation-moment change amount M' and a control current I. It is not always necessary that the control table includes the relationship between a bar-handle-rotation-moment change amount M' and an actuator torque Tr. Further, a control current I may be a signal showing a control value for allowing a power supply circuit to supply power to the actuator 70, or may be a drive current to be supplied to the actuator 70.

[Operations]

Figure 6:
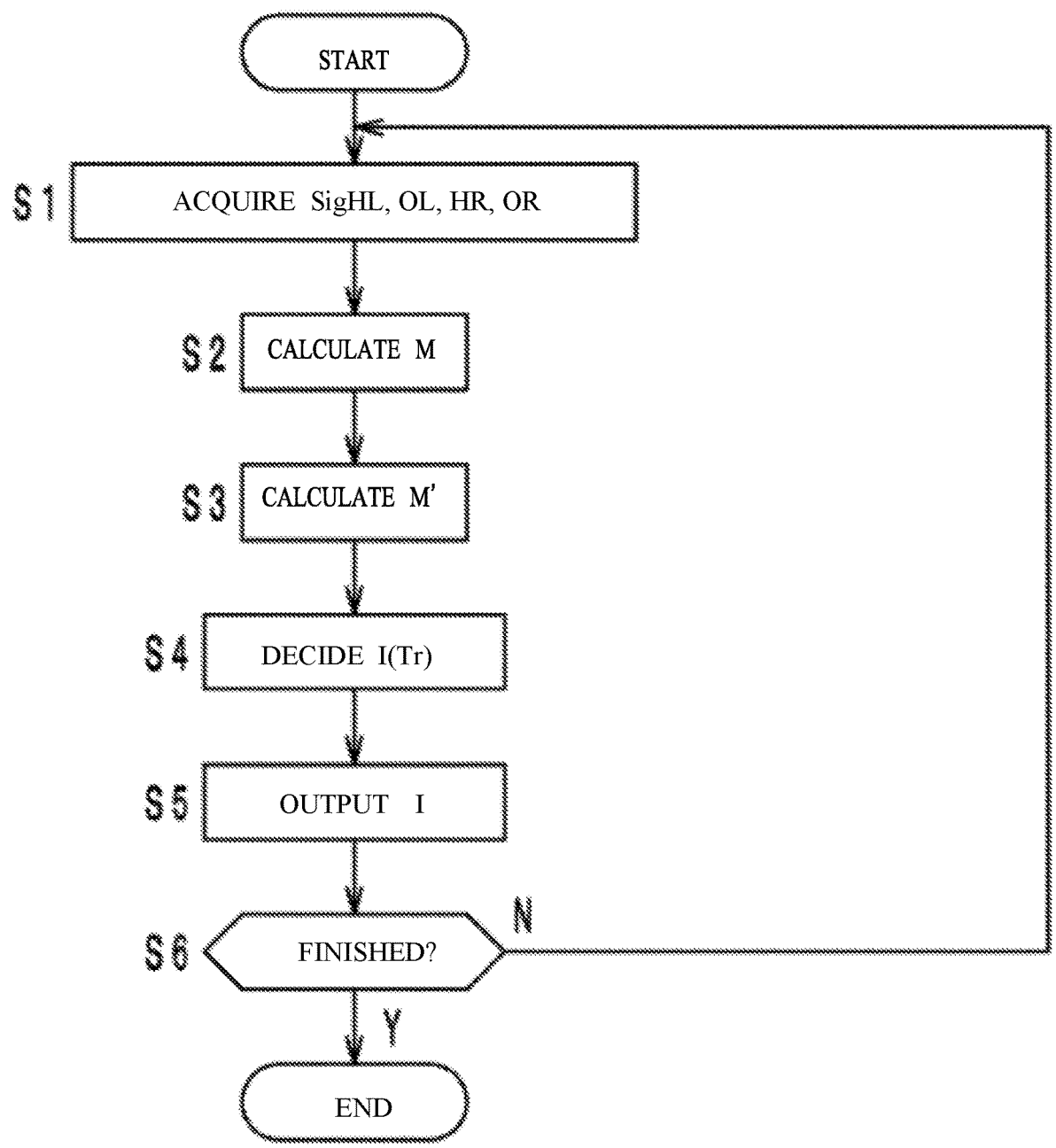
FIG. 6 is a flowchart showing operations which are performed by a bar-handle-rotation-moment-change-amount calculation unit 90M and the actuator control unit 61 of the leaning vehicle 1.

Hereinafter, the operations of the leaning vehicle 1 will be described with reference to drawings. FIG. 6 is a flowchart showing the operations performed by the bar-handle-rotation-moment-change-amount calculation unit 90M and the actuator control unit 61 of the leaning vehicle 1. The bar-handle-rotation-moment-change-amount calculation unit 90M and the actuator control unit 61 perform the flowchart shown in FIG. 6 by performing a program stored in a memory unit not shown in the drawing.

This process is started when ignition power supply of the leaning vehicle 1 is switched from an OFF state to an ON state. When this process is started, the left-front pressure sensor 90La, the left-rear pressure sensor 90Lb, the right-front pressure sensor 90Ra and the right-rear pressure sensor 90Rb respectively output, to the bar-handle-rotation-moment-change-amount calculation unit 90M, a left-front pressure sensor signal SigHL having a voltage which corresponds to a left-grip pulling force HL, a left-rear pressure sensor signal SigOL having a voltage which corresponds to a left-grip pushing force OL, a right-front pressure sensor signal SigHR having a voltage which corresponds to a right-grip pulling force HR, and a right-rear pressure sensor signal SigOR having a voltage which corresponds to a right-grip pushing force OR. With such outputs, the bar-handle-rotation-moment-change-amount calculation unit 90M acquires the left-front pressure sensor signal SigHL, the left-rear pressure sensor signal SigOL, the right-front pressure sensor signal SigHR, and the right-rear pressure sensor signal SigOR (step S1).

Next, the bar-handle-rotation-moment-change-amount calculation unit 90M calculates bar-handle rotation moment M based on the left-front pressure sensor signal SigHL, the left-rear pressure sensor signal SigOL, the right-front pressure sensor signal SigHR, and the right-rear pressure sensor signal SigOR (step S2). Specifically, the bar-handle-rotation-moment-change-amount calculation unit 90M identifies the left-grip pulling force HL, the left-grip pushing force OL, the right-grip pulling force HR, and the right-grip pushing force OR based on the left-front pressure sensor signal SigHL, the left-rear pressure sensor signal SigOL, the right-front pressure sensor signal SigHR, and the right-rear pressure sensor signal SigOR. Further, the bar-handle-rotation-moment-change-amount calculation unit 90M calculates bar-handle rotation moment M by substituting the left-grip pulling force HL, the left-grip pushing force OL, the right-grip pulling force HR, and the right-grip pushing force OR into the formula (1).

Then, the bar-handle-rotation-moment-change-amount calculation unit 90M calculates a bar-handle-rotation-moment change amount M' by time-differentiating bar-handle rotation moment M (step S3). The bar-handle-rotation-moment-change-amount calculation unit 90M outputs the bar-handle-rotation-moment change amount M' to the actuator control unit 61.

Then, the actuator control unit 61 decides, based on the control table shown in FIG. 5, a control current I which corresponds to the bar-handle-rotation-moment change amount M' (step S4).

Then, the actuator control unit 61 outputs the control current I to the actuator 70 (step S5). With such an output, the actuator 70 applies an actuator torque Tr which corresponds to the control current I to the steering shaft 9.

Then, the actuator control unit 61 determines whether or not this process is finished (step S6). The finish of this process is determined by whether or not the ignition power supply is switched to an OFF state from an ON state, for example. In the case where the ignition power supply is switched to the OFF state from the ON state, this process is finished. In the case where the ignition power supply is not switched to the OFF state from the ON state, this process is returned to step S1. Thereafter, process from step S1 to step S6 is repeated. Time required to perform step S1 to step S6 corresponds to Δt in the formula (2), for example.

Operation Example

Figure 7A:
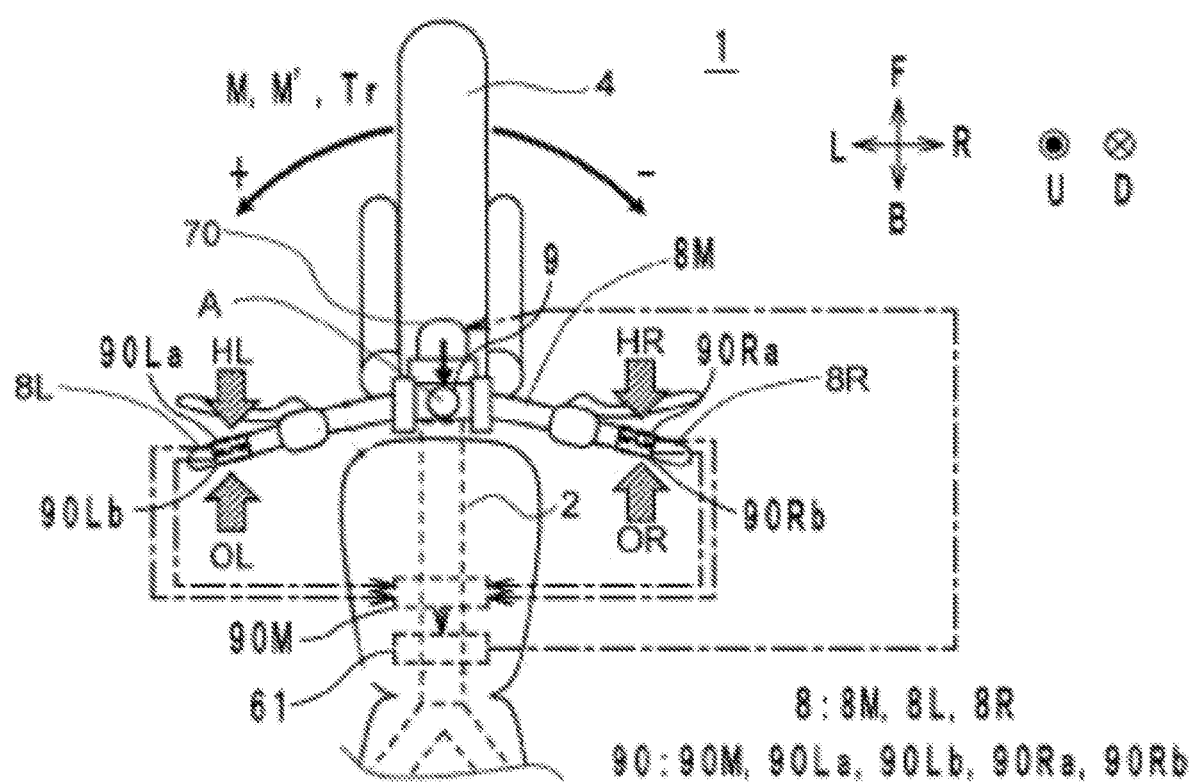
FIG. 7A is a view of a front portion of the leaning vehicle 1 as viewed in the downward direction D.
Figure 7B:
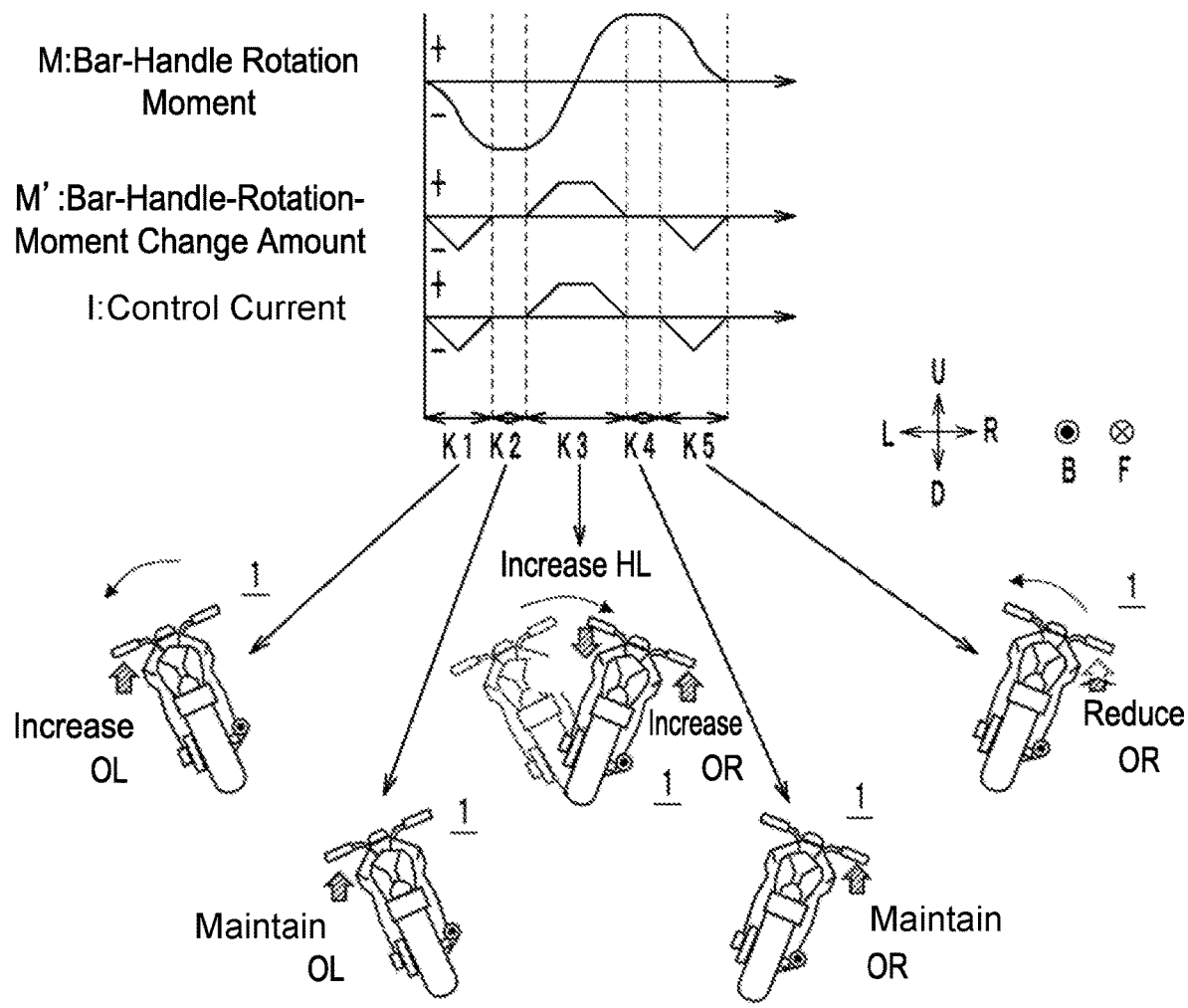
FIG. 7B is a graph showing the relationship of bar-handle rotation moment M, a bar-handle-rotation-moment change amount M' and a control current I with respect to time, and a view showing a change in posture of the leaning vehicle 1.

Next, operation examples of the leaning vehicle 1 will be described. FIG. 7A is a view of the front portion of the leaning vehicle 1 as viewed in the downward direction D. FIG. 7B is a graph showing the relationship of bar-handle rotation moment M, a bar-handle-rotation-moment change amount M' and a control current I with respect to time, and is also a view showing a change in posture of the leaning vehicle 1. Time is taken on an axis of abscissas in the graph. Bar-handle rotation moment M, a bar-handle-rotation-moment change amount M', and a control current I are taken on an axis of ordinates.

An operation example shown in FIG. 7B includes the following periods K1 to K5. In the period K1, a rider leans the vehicle body frame 2 in the leftward direction L so as to cause the leaning vehicle 1 to turn in the leftward direction L. In the period K2, the rider maintains a state where the vehicle body frame 2 leans in the leftward direction L to cause the leaning vehicle 1 to turn in the leftward direction L. In the period K3, the rider leans the vehicle body frame 2 in the rightward direction R from the leftward direction L so as to cause the leaning vehicle 1 to turn in the rightward direction R. In the period K4, the rider maintains a state where the vehicle body frame 2 leans in the rightward direction R to cause the leaning vehicle 1 to turn in the rightward direction R. In the period K5, the rider returns the vehicle body frame 2 to an upright state.

In the period K1, to cause the leaning vehicle 1 to turn in the leftward direction L, the rider manipulates the bar handle 8 to steer the steerable wheel 4 in the rightward direction R. To perform such an operation, the rider performs the left-grip-pushing-force increasing operation by increasing a left-grip pushing force OL. With such an operation, the magnitude of bar-handle rotation moment M in the clockwise direction increases. That is, bar-handle rotation moment M takes a negative value, and the magnitude of bar-handle rotation moment M increases. As a result, the bar-handle-rotation-moment-change-amount calculation unit 90M acquires a bar-handle-rotation-moment change amount M' in the clockwise direction. That is, the bar-handle-rotation-moment-change-amount calculation unit 90M acquires a bar-handle-rotation-moment change amount M' having a negative value. The actuator control unit 61 decides a control current I which corresponds to the bar-handle-rotation-moment change amount M' using the control table shown in FIG. 5. At this point of operation, the control current I takes a negative value. Accordingly, the actuator control unit 61 outputs the control current I having a negative value, thus causing the actuator 70 to generate an actuator torque Tr having a negative value. That is, the actuator 70 generates the actuator torque Tr in the clockwise direction. As a result, the actuator 70 applies an actuator torque Tr which steers the steerable wheel 4 in the rightward direction R to the steering shaft 9.

In the first half of the period K1, the magnitude of bar-handle rotation moment M having a negative value (bar-handle rotation moment M in the clockwise direction) increases, and the magnitude of bar-handle-rotation-moment change amount M' having a negative value (bar-handle-rotation-moment change amount M' in the clockwise direction) increases. In this case, the actuator control unit 61 causes the magnitude of actuator torque Tr having a negative value (actuator torque Tr in the clockwise direction) to increase. To perform such an operation, the actuator control unit 61 causes the magnitude of control current I having a negative value to increase.

In the latter half of the period K1, the magnitude of bar-handle rotation moment M having a negative value (bar-handle rotation moment M in the clockwise direction) increases, and the magnitude of bar-handle-rotation-moment change amount M' having a negative value (bar-handle-rotation-moment change amount M' in the clockwise direction) decreases. In this case, the actuator control unit 61 causes the magnitude of actuator torque Tr having a negative value (actuator torque Tr in the clockwise direction) to reduce. To perform such an operation, the actuator control unit 61 causes the magnitude of control current I having a negative value to reduce.

In this specification, the first half of a period is a first short period of two short periods acquired by dividing the period in half. The latter half of the period is a second short period of the two short periods acquired by dividing the period in half.

In the period K2, the steerable wheel 4 tends to steer in the leftward direction L due to self-steering. Accordingly, the rider applies a force to the bar handle 8 so as to prevent the steerable wheel 4 from being steered in the leftward direction L. That is, the rider maintains the steering so as to prevent the bar handle 8 from rotating. To perform such an operation, the rider maintains a left-grip pushing force OL at a fixed magnitude. With such an operation, the magnitude of bar-handle rotation moment M in the clockwise direction is maintained. That is, bar-handle rotation moment M takes a negative value, and the magnitude of bar-handle rotation moment M is fixed. As a result, the bar-handle-rotation-moment-change-amount calculation unit 90M acquires a bar-handle-rotation-moment change amount M' of zero. The actuator control unit 61 decides a control current I which corresponds to the bar-handle-rotation-moment change amount M' using the control table shown in FIG. 5. At this point of operation, the control current I takes a value of zero. Accordingly, the actuator control unit 61 neither outputs the control current I nor causes the actuator 70 to generate an actuator torque Tr. As a result, the actuator 70 does not apply, to the steering shaft 9, an actuator torque Tr which steers the steerable wheel 4 in the leftward direction L or in the rightward direction R.

In the period K3, the rider leans the vehicle body frame 2 in the rightward direction R from the leftward direction L so as to cause the leaning vehicle 1 to turn in the rightward direction R. To perform such an operation, the rider performs the left-grip-pulling-force increasing operation and the right-grip-pushing-force increasing operation by increasing a left-grip pulling force HL and by increasing a right-grip pushing force OR. With such operations, bar-handle rotation moment M in the clockwise direction is changed to bar-handle rotation moment M in the counterclockwise direction. That is, the bar-handle rotation moment M is changed from a negative value to a positive value. As a result, the bar-handle-rotation-moment-change-amount calculation unit 90M acquires a bar-handle-rotation-moment change amount M' in the counterclockwise direction. That is, the bar-handle-rotation-moment-change-amount calculation unit 90M acquires the bar-handle-rotation-moment change amount M' having a positive value. The actuator control unit 61 decides a control current I which corresponds to the bar-handle-rotation-moment change amount M' using the control table shown in FIG. 5. At this point of operation, the control current I takes a positive value. Accordingly, the actuator control unit 61 outputs the control current I having a positive value, thus causing the actuator 70 to generate an actuator torque Tr having a positive value. That is, the actuator 70 generates the actuator torque Tr in the counterclockwise direction. As a result, the actuator 70 applies, to the steering shaft 9, an actuator torque Tr which steers the steerable wheel 4 in the leftward direction L.

In the first period of the period K3, the magnitude of bar-handle rotation moment M having a negative value (bar-handle rotation moment M in the clockwise direction) decreases, and the magnitude of bar-handle-rotation-moment change amount M' having a positive value (bar-handle-rotation-moment change amount M' in the counterclockwise direction) increases. In this case, the actuator control unit 61 causes the magnitude of actuator torque Tr having a positive value (actuator torque Tr in the counterclockwise direction) to increase. To perform such an operation, the actuator control unit 61 causes the magnitude of control current I having a positive value to increase.

In the intermediate period of the period K3, bar-handle rotation moment M linearly changes from a negative value to a positive value. At this point of operation, the magnitude of bar-handle-rotation-moment change amount M' having a positive value (bar-handle-rotation-moment change amount M' in the counterclockwise direction) is fixed. In this case, the actuator control unit 61 maintains the magnitude of actuator torque Tr having a positive value (actuator torque Tr in the counterclockwise direction) at a fixed magnitude. To perform such an operation, the actuator control unit 61 maintains the magnitude of control current I having a positive value at a fixed magnitude.

In the latter period of the period K3, the magnitude of bar-handle rotation moment M having a positive value (bar-handle rotation moment M in the counterclockwise direction) increases, and the magnitude of bar-handle-rotation-moment change amount M' having a positive value (bar-handle-rotation-moment change amount M' in the counterclockwise direction) decreases. In this case, the actuator control unit 61 causes the magnitude of actuator torque Tr having a positive value (actuator torque Tr in the counterclockwise direction) to reduce. To perform such an operation, the actuator control unit 61 causes the magnitude of control current I having a positive value to reduce.

In this specification, the first period of a period is a first short period of three short periods acquired by equally dividing the period into three periods. The intermediate period of the period is a second short period of the three short periods acquired by equally dividing the period into three periods. The latter period of the period is a third short period of the three short periods acquired by equally dividing the period into three periods.

In the period K4, the steerable wheel 4 tends to steer in the rightward direction R due to self-steering. Accordingly, the rider applies a force to the bar handle 8 so as to prevent the steerable wheel 4 from being steered in the rightward direction R. That is, the rider maintains the steering so as to prevent the bar handle 8 from rotating. To perform such an operation, the rider maintains a right-grip pushing force OR at a fixed magnitude. With such an operation, the magnitude of bar-handle rotation moment M in the counterclockwise direction is maintained. That is, bar-handle rotation moment M takes a positive value, and the magnitude of bar-handle rotation moment M is fixed. As a result, the bar-handle-rotation-moment-change-amount calculation unit 90M acquires a bar-handle-rotation-moment change amount M' of zero. The actuator control unit 61 decides a control current I which corresponds to the bar-handle-rotation-moment change amount M' using the control table shown in FIG. 5. At this point of operation, the control current I takes a value of zero. Accordingly, the actuator control unit 61 neither outputs a control current I nor causes the actuator 70 to generate an actuator torque Tr. As a result, the actuator 70 does not apply, to the steering shaft 9, an actuator torque Tr which steers the steerable wheel 4 in the leftward direction L or in the rightward direction R.

In the period K5, to return the vehicle body frame 2 which leans in the rightward direction R to the upright state, the rider manipulates the bar handle 8 to steer the steerable wheel 4 in the rightward direction R. To perform such an operation, the rider performs the right-grip-pushing-force reducing operation by reducing the right-grip pushing force OR. The rider may perform a left-grip-pushing-force increasing operation and/or a right-grip-pulling-force increasing operation. With such an operation, the magnitude of bar-handle rotation moment M in the counterclockwise direction decreases. That is, bar-handle rotation moment M takes a positive value, and the magnitude of bar-handle rotation moment M decreases. As a result, the bar-handle-rotation-moment-change-amount calculation unit 90M acquires a bar-handle-rotation-moment change amount M' in the clockwise direction. That is, the bar-handle-rotation-moment-change-amount calculation unit 90M acquires a bar-handle-rotation-moment change amount M' having a negative value. The actuator control unit 61 decides a control current I which corresponds to the bar-handle-rotation-moment change amount M' using the control table shown in FIG. 5. At this point of operation, the control current I takes a negative value. Accordingly, the actuator control unit 61 outputs the control current I having a negative value, thus causing the actuator 70 to generate an actuator torque Tr having a negative value. That is, the actuator 70 generates an actuator torque Tr in the clockwise direction. As a result, the actuator 70 applies, to the steering shaft 9, an actuator torque Tr which steers the steerable wheel 4 in the rightward direction R. With such operations, the vehicle body frame 2 which leans in the rightward direction R returns to an upright state.

In the first half of the period K5, the magnitude of bar-handle rotation moment M having a positive value (bar-handle rotation moment M in the counterclockwise direction) decreases, and the magnitude of bar-handle-rotation-moment change amount M' having a negative value (bar-handle-rotation-moment change amount M' in the clockwise direction) increases. In this case, the actuator control unit 61 causes the magnitude of actuator torque Tr having a negative value (actuator torque Tr in the clockwise direction) to increase. To perform such an operation, the actuator control unit 61 causes the magnitude of control current I having a negative value to increase.

In the latter half of the period K5, the magnitude of bar-handle rotation moment M having a positive value (bar-handle rotation moment M in the counterclockwise direction) decreases, and the magnitude of bar-handle-rotation-moment change amount M' having a negative value (bar-handle-rotation-moment change amount M' in the clockwise direction) decreases. In this case, the actuator control unit 61 causes the magnitude of actuator torque Tr having a negative value (actuator torque Tr in the clockwise direction) to reduce. To perform such an operation, the actuator control unit 61 causes the magnitude of control current I having a negative value to reduce.

Advantageous Effect

The leaning vehicle 1 according to this embodiment can perform control of a leaning posture by a bar handle which differs from a prior art technique. More specifically, in the leaning vehicle 1, the posture of the leaning vehicle 1 changes with a grip manipulation operation, such as the left-grip-pushing-force increasing operation, the right-grip-pulling-force increasing operation, the left-grip-pulling-force reducing operation, the right-grip-pushing-force reducing operation, the right-grip-pushing-force increasing operation, the left-grip-pulling-force increasing operation, the right-grip-pulling-force reducing operation, or the left-grip-pushing-force reducing operation. Accordingly, the bar-handle-input-operation acquiring unit 90 acquires a bar-handle-rotation-moment change amount M' to determine that the grip manipulation operation is performed, such as the left-grip-pushing-force increasing operation, the right-grip-pulling-force increasing operation, the left-grip-pulling-force reducing operation, the right-grip-pushing-force reducing operation, the right-grip-pushing-force increasing operation, the left-grip-pulling-force increasing operation, the right-grip-pulling-force reducing operation, or the left-grip-pushing-force reducing operation. As described above, acquiring a bar-handle-rotation-moment change amount M' allows the bar-handle-input-operation acquiring unit 90 to rapidly determine that the grip manipulation operation is performed.

Further, in the case where a bar-handle-rotation-moment change amount M' in the counterclockwise direction is generated by a rider performing one operation of the right-grip-pushing-force increasing operation, the left-grip-pulling-force increasing operation, the right-grip-pulling-force reducing operation, and the left-grip-pushing-force reducing operation, the actuator control unit 61 causes the actuator 70 to generate an actuator torque Tr in the counterclockwise direction based on the bar-handle-rotation-moment change amount M'. With such operations, the actuator 70 can generate an actuator torque Tr which follows the right-grip-pushing-force increasing operation, the left-grip-pulling-force increasing operation, the right-grip-pulling-force reducing operation, or the left-grip-pushing-force reducing operation performed by the rider. In the case where a bar-handle-rotation-moment change amount M' in the clockwise direction is generated by a rider performing one operation of the left-grip-pushing-force increasing operation, the right-grip-pulling-force increasing operation, the left-grip-pulling-force reducing operation, and the right-grip-pushing-force reducing operation, the actuator control unit 61 causes the actuator 70 to generate an actuator torque Tr in the clockwise direction based on the bar-handle-rotation-moment change amount M'. With such operations, the actuator 70 can generate an actuator torque Tr which follows the left-grip-pushing-force increasing operation, the right-grip-pulling-force increasing operation, the left-grip-pulling-force reducing operation, or the right-grip-pushing-force reducing operation performed by a rider. As a result, according to the leaning vehicle 1, it is possible to perform control of a leaning posture by the bar handle 8 which differs from a prior art technique.

Specific Example

Hereinafter, the specific example of operation of the leaning vehicle 1 will be described. FIG. 8, FIG. 9, FIG. 10, and FIG. 11 are graphs showing the relationship of bar-handle rotation moment M, a bar-handle-rotation-moment change amount M' and a control current I with respect to time. In the graphs, time is taken on an axis of abscissas. Bar-handle rotation moment M, a bar-handle-rotation-moment change amount M', and a control current I are taken on an axis of ordinates.

Figure 8:
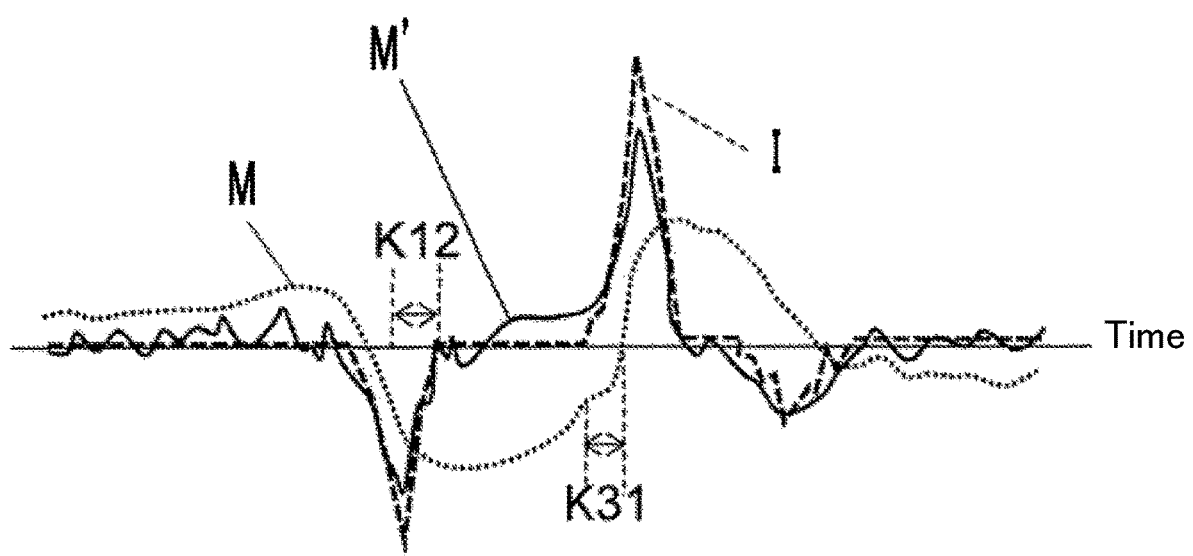
FIG. 8 is a graph showing the relationship of bar-handle rotation moment M, a bar-handle-rotation-moment change amount M' and a control current I with respect to time.

FIG. 8 is a graph showing the relationship of bar-handle rotation moment M, a bar-handle-rotation-moment change amount M' and a control current I with respect to time when the leaning vehicle 1 performs the operation shown in FIG. 7B. A period K12 shown in FIG. 8 corresponds to the latter half of the period K1 shown in FIG. 7B. A period K31 shown in FIG. 8 corresponds to the first period of the period K3 shown in FIG. 7B. Changes in bar-handle rotation moment M, bar-handle-rotation-moment change amount M' and control current I shown in FIG. 8 are substantially equal to changes in bar-handle rotation moment M, bar-handle-rotation-moment change amount M' and control current I shown in FIG. 7B and hence, the description of such changes is omitted.

Figure 9:
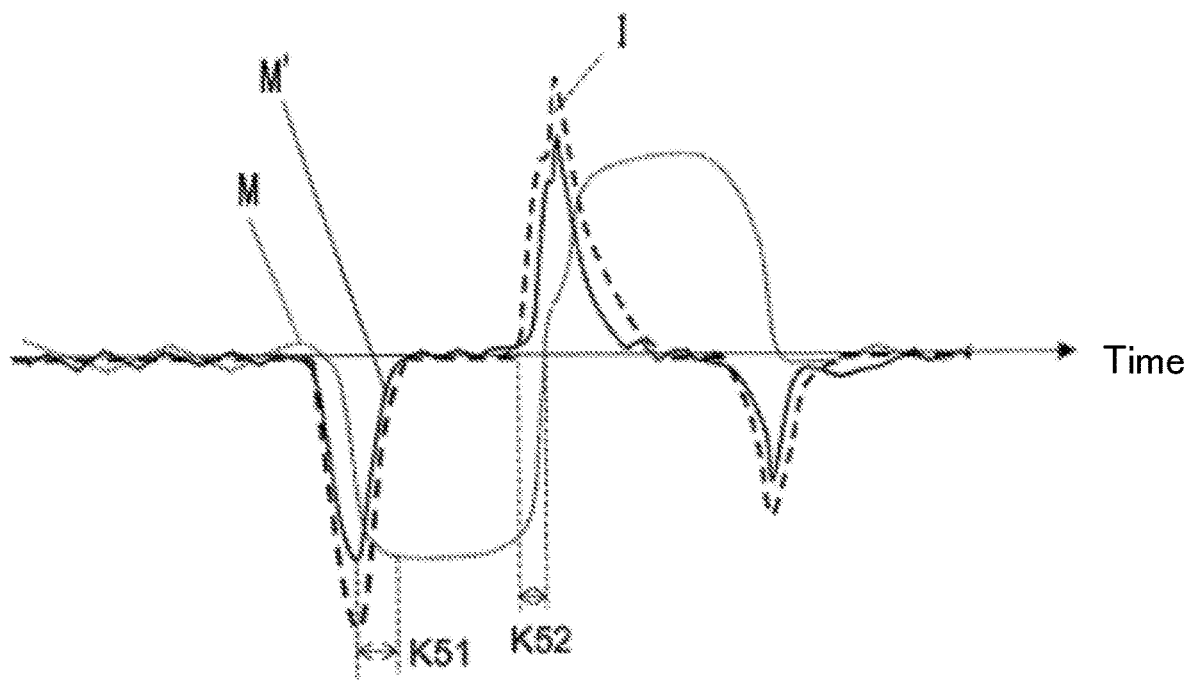
FIG. 9 is a graph showing the relationship of bar-handle rotation moment M, a bar-handle-rotation-moment change amount M' and a control current I with respect to time.

FIG. 9 is a graph showing the relationship of bar-handle rotation moment M, a bar-handle-rotation-moment change amount M' and a control current I with respect to time when the leaning vehicle 1 performs the operation shown in FIG. 7B. In the specific example shown in FIG. 9, followability of the control current I with respect to the bar-handle-rotation-moment change amount M' is higher than that in the specific example shown in FIG. 8. A period K51 shown in FIG. 9 corresponds to the latter half of the period K1 shown in FIG. 7B. A period K52 shown in FIG. 9 corresponds to the first period of the period K3 shown in FIG. 7B. Changes in bar-handle rotation moment M, bar-handle-rotation-moment change amount M' and control current I shown in FIG. 9 are substantially equal to changes in bar-handle rotation moment M, bar-handle-rotation-moment change amount M' and control current I shown in FIG. 7B and hence, the description of such changes is omitted.

Figure 10:
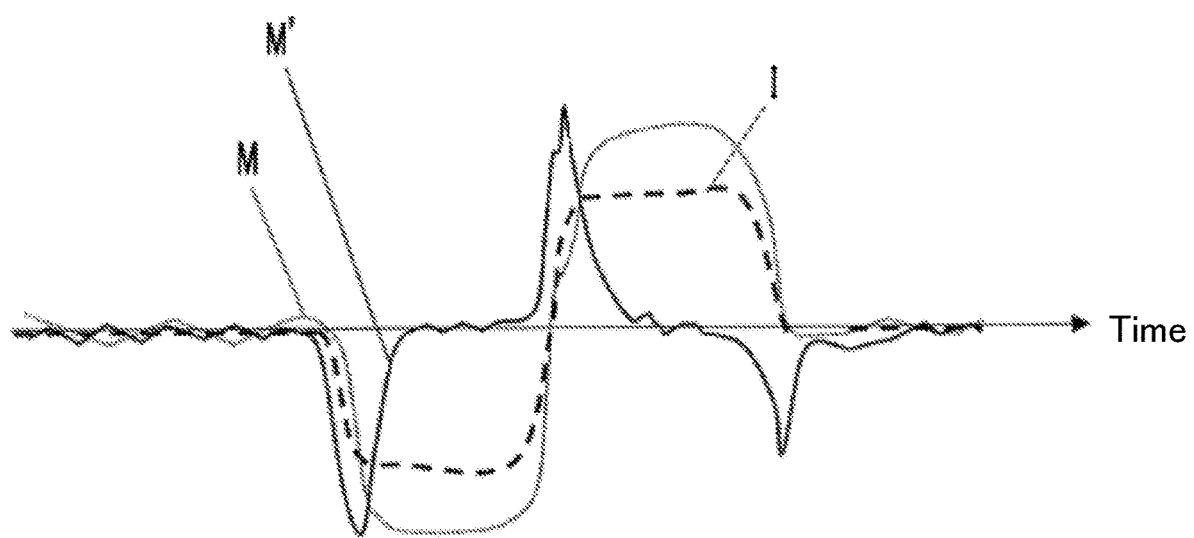
FIG. 10 is a graph showing the relationship of bar-handle rotation moment M, a bar-handle-rotation-moment change amount M' and a control current I with respect to time.

FIG. 10 is a graph showing the relationship of bar-handle rotation moment M, a bar-handle-rotation-moment change amount M' and a control current I with respect to time when the leaning vehicle 1 performs the operation shown in FIG. 7B. In the specific example shown in FIG. 10, the actuator control unit 61 outputs a control current I such that an actuator torque Tr follows bar-handle rotation moment M. That is, the actuator control unit 61 causes bar-handle rotation moment M to follow a control current I. Specifically, the actuator control unit 61 performs operations (A) to (D).

(A) In the case where the magnitude of bar-handle rotation moment M having a positive value (bar-handle rotation moment M in the counterclockwise direction) increases, and the magnitude of bar-handle-rotation-moment change amount M' having a positive value (bar-handle-rotation-moment change amount M' in the counterclockwise direction) decreases: the actuator control unit 61 does not cause the magnitude of an actuator torque Tr having a positive value (actuator torque Tr in the counterclockwise direction) to reduce. To perform such an operation, in the specific example shown in FIG. 10, the actuator control unit 61 does not cause the magnitude of control current I having a positive value to reduce in the latter period of the period K3 (see FIG. 7B).

(B) In the case where the magnitude of bar-handle rotation moment M having a negative value (bar-handle rotation moment M in the clockwise direction) increases, and the magnitude of bar-handle-rotation-moment change amount M' having a negative value (bar-handle-rotation-moment change amount M' in the clockwise direction) decreases: the actuator control unit 61 does not cause the magnitude of an actuator torque Tr having a negative value (actuator torque Tr in the clockwise direction) to reduce. To perform such an operation, in the specific example shown in FIG. 10, the actuator control unit 61 does not cause the magnitude of control current I having a negative value to reduce in the latter half of the period K1 (see FIG. 7B).

(C) In the case where the magnitude of bar-handle rotation moment M having a positive value (bar-handle rotation moment M in the counterclockwise direction) decreases, and the magnitude of bar-handle-rotation-moment change amount M' having a negative value (bar-handle-rotation-moment change amount M' in the clockwise direction) increases: the actuator control unit 61 does not cause the magnitude of an actuator torque Tr having a negative value (actuator torque Tr in the clockwise direction) to increase. To perform such an operation, in the specific example shown in FIG. 10, the actuator control unit 61 does not cause the magnitude of control current I having a negative value to increase in the first half of the period K5 (see FIG. 7B).

(D) In the case where the magnitude of bar-handle rotation moment M having a negative value (bar-handle rotation moment M in the clockwise direction) decreases, and the magnitude of bar-handle-rotation-moment change amount M' having a positive value (bar-handle-rotation-moment change amount M' in the counterclockwise direction) increases: the actuator control unit 61 does not cause the magnitude of an actuator torque Tr having a positive value (actuator torque Tr in the counterclockwise direction) to increase. To perform such an operation, in the specific example shown in FIG. 10, the actuator control unit 61 does not cause the magnitude of control current I having a positive value to increase in the first period of the period K3 (see FIG. 7B).

Figure 11:
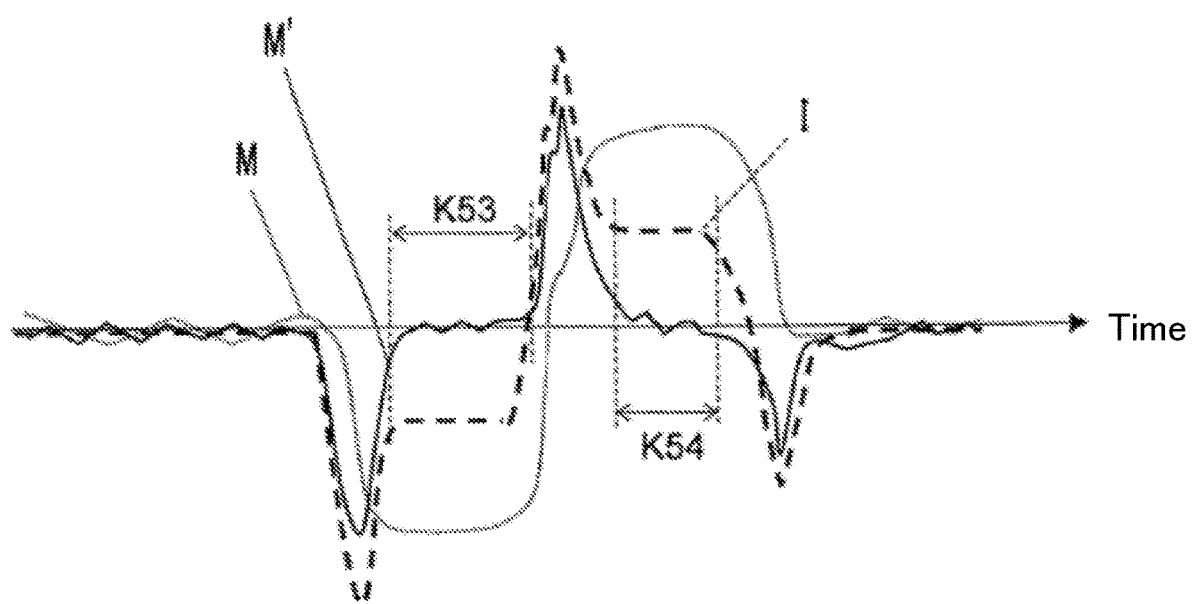
FIG. 11 is a graph showing the relationship of bar-handle rotation moment M, a bar-handle-rotation-moment change amount M' and a control current I with respect to time.

The actuator control unit 61 may combine control which causes bar-handle rotation moment M to follow an actuator torque Tr and control which causes a bar-handle-rotation-moment change amount M' to follow an actuator torque Tr. That is, the actuator control unit 61 may cause the actuator 70 to generate an actuator torque Tr based on the bar-handle rotation moment M and the bar-handle-rotation-moment change amount M'. In this case, the actuator control unit 61 can control the actuator 70 such that followability of the actuator torque Tr with respect to the bar-handle-rotation-moment change amount M' is higher than followability of the actuator torque Tr with respect to the bar-handle rotation moment M, for example. Hereinafter, the specific example will be described with reference to drawings. FIG. 11 is a graph showing the relationship of bar-handle rotation moment M, a bar-handle-rotation-moment change amount M' and a control current I with respect to time when the leaning vehicle 1 performs the operation shown in FIG. 7B.

In the specific example shown in FIG. 11, in the case where a bar-handle-rotation-moment change amount M' is not zero, the actuator control unit 61 causes the actuator 70 to generate an actuator torque Tr not based on bar-handle rotation moment M, but based on the bar-handle-rotation-moment change amount M'. That is, the actuator control unit 61 decides a control current I not based on the bar-handle rotation moment M, but based on the bar-handle-rotation-moment change amount M'.

To the contrary, as shown in periods K53, K54 shown in FIG. 11, in the case where a bar-handle-rotation-moment change amount M' is zero, and bar-handle rotation moment M is generated (that is, bar-handle rotation moment M is not zero), the actuator control unit 61 causes the actuator 70 to generate an actuator torque Tr based on the bar-handle rotation moment M. In this specific example, the actuator control unit 61 causes the actuator 70 to generate an actuator torque Tr not based on the bar-handle-rotation-moment change amount M', but based on the bar-handle rotation moment M. That is, the actuator control unit 61 decides a control current I not based on the bar-handle-rotation-moment change amount M', but based on the bar-handle rotation moment M. In the period K53 and the period K54, the actuator control unit 61 causes the actuator 70 to generate the actuator torque Tr based on the magnitude of bar-handle rotation moment M and a direction in which the bar-handle rotation moment M causes the bar handle 8 to rotate.

According to the specific example shown in FIG. 11, even when a bar-handle-rotation-moment change amount M' is zero, the actuator control unit 61 can cause the actuator 70 to generate an actuator torque Tr of a proper magnitude. The case where a bar-handle-rotation-moment change amount M' is zero includes the case where a bar-handle-rotation-moment change amount M' is exactly zero and the case where a bar-handle-rotation-moment change amount M' is small to an extent that the bar-handle-rotation-moment change amount M' can be assumed as zero. Further, the case where a bar-handle-rotation-moment change amount M' is zero, and bar-handle rotation moment M is generated is not limited to a mode where an actuator torque Tr based on the bar-handle rotation moment M is applied to the steerable wheel 4. In addition to the bar-handle rotation moment M and the bar-handle-rotation-moment change amount M', the actuator torque Tr may be applied to the steerable wheel 4 based on a parameter other than the bar-handle rotation moment M and the bar-handle-rotation-moment change amount M'.

In the specific example shown in FIG. 11, the actuator control unit 61 may cause the actuator 70 to generate an actuator torque Tr based on bar-handle rotation moment M and a bar-handle-rotation-moment change amount M'.

(Modification)

Figure 12:
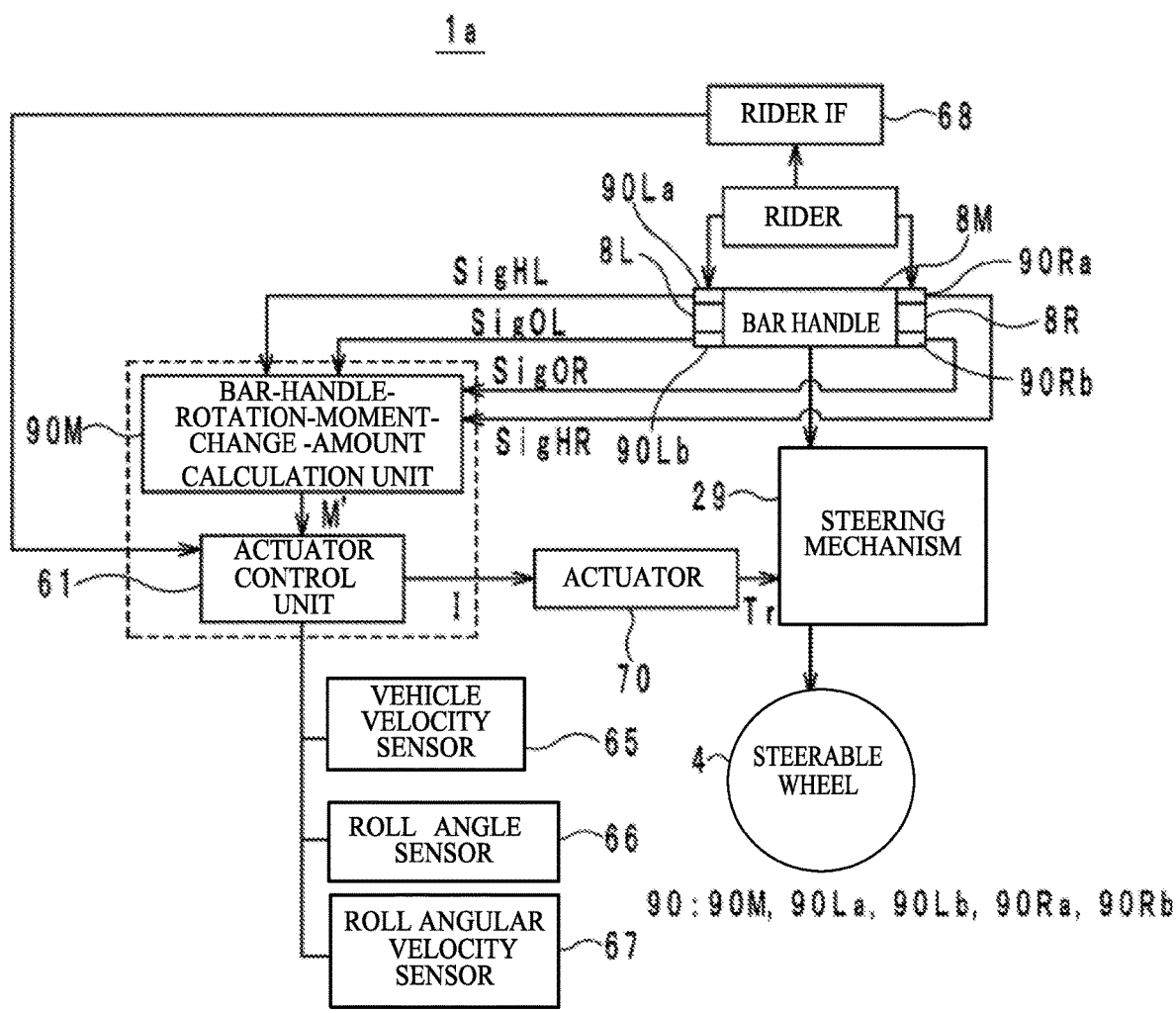

Hereinafter, a leaning vehicle 1a according to the modification will be described with reference to drawings. FIG. 12 is a function block diagram of the leaning vehicle 1a. The leaning vehicle 1a differs from the leaning vehicle 1 with respect to a point that the leaning vehicle 1a further includes a vehicle velocity sensor 65, a roll angle sensor 66, a roll angular velocity sensor 67, and a rider IF (interface) 68. The vehicle velocity sensor 65 detects velocity V of the leaning vehicle 1a.

The roll angle sensor (one example of a lean angle sensor) 66 detects the roll angle θ of the vehicle body frame 2. The roll angle θ is a lean angle of the center line of the vehicle body frame 2 in the left-right direction LR. The roll angle θ is a rotation angle of the vehicle body frame 2 about the roll axis Ax, and the roll angle θ changes with the rotation of the vehicle body frame 2 about the roll axis Ax. Hereinafter, a straight line which passes through the center in the left-right direction lr of the vehicle body frame 2 in an upright state, and which extends in the up-down direction ud is defined as the center line. The center line leans in the leftward direction L or in the rightward direction R together with the vehicle body frame 2 with leaning of the vehicle body frame 2 in the leftward direction L or in the rightward direction R. The roll angle θ is an angle formed between the vertical axis and the center line. The vertical axis is an axis parallel to the up-down direction UD.

The roll angular velocity sensor (one example of a lean angular velocity sensor) 67 detects roll angular velocity ω. The roll angular velocity ω is an amount of change in roll angle θ per unit time. The roll angular velocity sensor 67 detects roll angular velocity ω using a gyro sensor, for example.

The rider IF 68 is an interface which outputs input results upon reception of an input from a rider. The rider IF 68 may be a button, a lever, a switch, a touch panel or the like, for example. The rider IF 68 receives setting relating to the generation of an actuator torque Tr from a rider, for example.

First Operation Example

The first operation example of the leaning vehicle 1a will be described with reference to FIG. 12. In the first operation example, the actuator control unit 61 causes the actuator 70 to generate an actuator torque Tr based on a bar-handle-rotation-moment change amount M' and velocity V. More specifically, the entire vehicle velocity range of the leaning vehicle 1a is divided into a low velocity range and a high velocity range. The high velocity range is a range where velocity is higher than that in the low velocity range. In this case, the leaning vehicle 1a can cause an actuator torque Tr in the low velocity range and an actuator torque Tr in the high velocity range to differ from each other even when a bar-handle-rotation-moment change amount M' in the low velocity range and a bar-handle-rotation-moment change amount M' in the high velocity range are equal to each other. For example, when the velocity V of the leaning vehicle 1a is in the low velocity range, the actuator control unit 61 causes the actuator 70 to generate an actuator torque Tr of a relatively small magnitude. When the velocity V of the leaning vehicle 1a is in the high velocity range, the actuator control unit 61 causes the actuator 70 to generate an actuator torque Tr of a relatively large magnitude. As described above, in two situations having the same bar-handle-rotation-moment change amount M' but different velocities V, the leaning vehicle 1a can cause the actuator 70 to generate an actuator torque Tr suitable for each situation. The entire vehicle velocity range of the leaning vehicle 1a may be divided into two or more velocity ranges. Further, the magnitude of actuator torque Tr may be caused to change in a stepwise manner based on velocity V, or may be caused to continuously change based on velocity V.

Second Operation Example

The second operation example of the leaning vehicle 1a will be described with reference to FIG. 12. In the second operation example, the actuator control unit 61 causes the actuator 70 to generate an actuator torque Tr based on a bar-handle-rotation-moment change amount M' and a roll angle θ. For example, in the case where the magnitude of roll angle θ is larger than a threshold, the actuator control unit 61 causes the actuator 70 to output an actuator torque Tr which causes the vehicle body frame 2 to approach an upright state. Specifically, a roll angle θ may be divided into a large lean angle range and a small lean angle range. The large lean angle range is a range where the magnitude of roll angle θ is larger than the threshold. The small lean angle range is a range where the magnitude of roll angle θ is not more than the threshold. In this case, the actuator control unit 61 can control the actuator 70 such that an actuator torque Tr in the small lean angle range and an actuator torque Tr in the large lean angle range differ from each other even when a bar-handle-rotation-moment change amount M' in the small lean angle range and a bar-handle-rotation-moment change amount M' in the large lean angle range are equal to each other. For example, in the case where the vehicle body frame 2 leans in the leftward direction L at a roll angle θ of a magnitude larger than the threshold, the actuator control unit 61 causes an actuator torque Tr having a positive value to be generated so as to allow a steerable wheel 4 to be steered in the leftward direction L. In the case where the vehicle body frame 2 leans in the leftward direction L at a roll angle θ smaller than the threshold, the actuator control unit 61 causes an actuator torque Tr having a negative value to be generated so as to allow the steerable wheel 4 to be steered in the rightward direction R as viewed in the downward direction d. As described above, in two situations having the same bar-handle-rotation-moment change amount M' but different roll angles θ, the leaning vehicle 1a can cause the actuator 70 to generate an actuator torque Tr of a magnitude suitable for each situation. The lean angle range of the leaning vehicle 1a may be divided into two or more lean angle ranges. Further, the magnitude of actuator torque Tr may be caused to change in a stepwise manner based on a roll angle θ, or may be caused to continuously change based on a roll angle θ.

Third Operation Example

The third operation example of the leaning vehicle 1a will be described with reference to FIG. 12. In the third operation example, the actuator control unit 61 causes the actuator 70 to generate an actuator torque Tr based on a bar-handle-rotation-moment change amount M' and roll angular velocity co. In the case where the vehicle body frame 2 starts to approach an upright state, the actuator control unit 61 increases the magnitude of an actuator torque Tr outputted by the actuator 70, for example. In the case where the vehicle body frame 2 approaches the upright state, when the vehicle body frame 2 leans in the leftward direction L, roll angular velocity co is generated at which the vehicle body frame 2 rotates in the clockwise direction as viewed in the frontward direction F. In the case where the vehicle body frame 2 approaches the upright state, when the vehicle body frame 2 leans in the rightward direction R, roll angular velocity co is generated at which the vehicle body frame 2 rotates in the counterclockwise direction as viewed in the frontward direction F. Accordingly, the vehicle body frame 2 is allowed to easily approach the upright state. Further, in the case where the vehicle body frame 2 starts to tilt in the leftward direction L or in the rightward direction R, for example, the actuator control unit 61 reduces the magnitude of an actuator torque Tr outputted by the actuator 70. In the case where the vehicle body frame 2 tilts in the leftward direction L, roll angular velocity co is generated at which the vehicle body frame 2 rotates in the counterclockwise direction as viewed in the frontward direction F. Further, in the case where the vehicle body frame 2 tilts in the rightward direction R, roll angular velocity co is generated at which the vehicle body frame 2 rotates in the clockwise direction as viewed in the frontward direction F. Accordingly, the vehicle body frame 2 is prevented from easily tilting. Further, in the case where the vehicle body frame 2 starts to approach the upright state, for example, the actuator control unit 61 reduces the magnitude of an actuator torque Tr outputted by the actuator 70. With such an operation, the vehicle body frame 2 is prevented from easily approaching the upright state. Further, in the case where the vehicle body frame 2 starts to tilt in the leftward direction L or in the rightward direction R, for example, the actuator control unit 61 increases the magnitude of an actuator torque Tr outputted by the actuator 70. With such an operation, the vehicle body frame 2 is allowed to easily tilt. As described above, in two situations having the same bar-handle-rotation-moment change amount M' but different roll angular velocities w, the leaning vehicle 1a can cause the actuator 70 to generate an actuator torque Tr of a magnitude suitable for each situation.

Fourth Operation Example

The fourth operation example of the leaning vehicle 1a will be described with reference to FIG. 12. In the fourth operation example, the leaning vehicle 1a further includes the rider IF 68. The rider IF 68 receives, from a rider, an input relating to an actuator torque Tr generated by the actuator 70. The actuator control unit 61 causes the actuator 70 to generate an actuator torque Tr based on a bar-handle-rotation-moment change amount M' and an output from the rider IF 68. Specifically, in the case where a rider manipulates the rider IF 68 into an ON state, the rider IF 68 outputs an ON signal to the actuator control unit 61. In this case, the actuator control unit 61 causes the actuator 70 to output an actuator torque Tr based on a bar-handle-rotation-moment change amount M'. In the case where a rider manipulates the rider IF 68 into an OFF state, the rider IF 68 outputs an OFF signal to the actuator control unit 61. In this case, the actuator control unit 61 does not cause the actuator 70 to output an actuator torque Tr. The rider IF 68 may not be a switch which switches between an ON state and an OFF state, and may be a multi-step switch or a stepless switch which can adjust the magnitude of actuator torque Tr. With such a configuration, a rider can adjust the magnitude of an actuator torque Tr generated by the actuator 70 to a proper magnitude when the rider travels with luggage or a passenger mounted on the leaning vehicle 1a.

Other Embodiments

The embodiments and modifications described and/or illustrated in this specification are given for facilitating the understanding of this disclosure, and do not limit the concept of this disclosure. The above-mentioned embodiments and modifications may be adapted or altered without departing from the gist of the embodiments and modifications.

The gist includes any and all embodiments having equivalent elements, modifications, omissions, combinations (a combination of the feature of the embodiment and the feature of the modification, for example), alterations, and adaptations as would be appreciated by one skilled in the art based on the embodiments disclosed in this specification. The limitations in the claims are to be interpreted broadly based on the term employed in the claims, and not limited to the embodiments and modifications described in this specification or during the prosecution of this application. Such embodiments and modifications are to be construed as non-exclusive. For example, in this specification, the term "preferably" or "may" is non-exclusive and means "preferably, but not limited to" or "may be . . . , but not limited to".

The bar-handle-input-operation acquiring unit 90 acquires a bar-handle-rotation-moment change amount M' which is generated by a rider performing one operation of the left-grip-pushing-force increasing operation, the right-grip-pulling-force increasing operation, the left-grip-pulling-force reducing operation, the right-grip-pushing-force reducing operation, the right-grip-pushing-force increasing operation, the left-grip-pulling-force increasing operation, the right-grip-pulling-force reducing operation, and the left-grip-pushing-force reducing operation. Accordingly, the rider may perform two or more grip manipulation operations selected from the left-grip-pushing-force increasing operation, the right-grip-pulling-force increasing operation, the left-grip-pulling-force reducing operation, the right-grip-pushing-force reducing operation, the right-grip-pushing-force increasing operation, the left-grip-pulling-force increasing operation, the right-grip-pulling-force reducing operation, and the left-grip-pushing-force reducing operation. In the case where the rider performs two or more grip manipulation operations, the bar-handle-input-operation acquiring unit 90 acquires a bar-handle-rotation-moment change amount M' generated by the rider performing the two or more operations. The two or more grip manipulation operations may be a combination of grip manipulation operations which generate a bar-handle-rotation-moment change amounts M' in directions opposite to each other. The bar-handle-input-operation acquiring unit 90 may acquire a bar-handle-rotation-moment change amount M' in the clockwise direction by combining the left-grip-pushing-force increasing operation and the right-grip-pushing-force increasing operation, for example. The two or more grip manipulation operations may be a combination of grip manipulation operations which generate a bar-handle-rotation-moment change amounts M' in the same direction. The bar-handle-input-operation acquiring unit 90 may acquire a bar-handle-rotation-moment change amount M' in the clockwise direction by combining the left-grip-pushing-force increasing operation and the right-grip-pulling-force increasing operation, for example.

In the leaning vehicle 1, in the first period of the period K3, the magnitude of bar-handle rotation moment M having a negative value (bar-handle rotation moment M in the clockwise direction) decreases, and the magnitude of bar-handle-rotation-moment change amount M' having a positive value (bar-handle-rotation-moment change amount M' in the counterclockwise direction) increases. In this case, the actuator control unit 61 causes the magnitude of an actuator torque Tr having a positive value (an actuator torque Tr in the counterclockwise direction) to increase. In the same manner as the above, in the leaning vehicle 1, in the case where the magnitude of bar-handle rotation moment M having a positive value (bar-handle rotation moment M in the counterclockwise direction) decreases, and the magnitude of bar-handle-rotation-moment change amount M' having a negative value (bar-handle-rotation-moment change amount M' in the clockwise direction) increases, the actuator control unit 61 may cause the magnitude of an actuator torque Tr having a negative value (an actuator torque Tr in the clockwise direction) to increase. The leaning vehicle 1a may also perform the same operation as the leaning vehicle 1.

In the leaning vehicle 1, in the latter period of the period K3, the magnitude of bar-handle rotation moment M having a positive value (bar-handle rotation moment M in the counterclockwise direction) increases, and the magnitude of bar-handle-rotation-moment change amount M' having a positive value (bar-handle-rotation-moment change amount M' in the counterclockwise direction) decreases. In this case, the actuator control unit 61 causes the magnitude of an actuator torque Tr having a positive value (an actuator torque Tr in the counterclockwise direction) to reduce. In the same manner as the above, in the leaning vehicle 1, in the case where the magnitude of bar-handle rotation moment M having a negative value (bar-handle rotation moment M in the clockwise direction) increases, and the magnitude of bar-handle-rotation-moment change amount M' having a negative value (bar-handle-rotation-moment change amount M' in the clockwise direction) decreases, the actuator control unit 61 may cause the magnitude of an actuator torque Tr having a negative value (an actuator torque Tr in the clockwise direction) to reduce. The leaning vehicle 1a may also perform the same operation as the leaning vehicle 1.

The bar-handle-input-operation acquiring unit 90 is not limited to an example shown in FIG. 4. For example, the bar-handle-input-operation acquiring unit 90 may have a configuration which includes at least one of the left-front pressure sensor 90La, the left-rear pressure sensor 90Lb, the right-front pressure sensor 90Ra, or the right-rear pressure sensor 90Rb. For example, the bar-handle-input-operation acquiring unit 90 may include only either one of the left-rear pressure sensor 90Lb or the right-rear pressure sensor 90Rb, or may include the left-rear pressure sensor 90Lb and the right-rear pressure sensor 90Rb. Further, the bar-handle-input-operation acquiring unit 90 may include only either one of the left-front pressure sensor 90La or the right-front pressure sensor 90Ra, or may include the left-front pressure sensor 90La and the right-front pressure sensor 90Ra.

The bar-handle-input-operation acquiring unit 90 may include a sensor which differs from a pressure sensor in place of the left-front pressure sensor 90La, the left-rear pressure sensor 90Lb, the right-front pressure sensor 90Ra, or the right-rear pressure sensor 90Rb. For example, the bar-handle-input-operation acquiring unit 90 may include a torque sensor which detects torque of rotation about the axis A of the bar handle 8 or of a member which rotates together with the bar handle 8. The torque sensor detects twisting or distortion of a transmission member which is caused by the rotation of the bar handle 8, for example. The transmission member is a member which transmits the rotation of the bar handle 8 about the axis A to the steerable wheel 4, and which is included in the steering mechanism 29. The bar-handle-input-operation acquiring unit 90 can acquire an amount of change per unit time in torque detected by the torque sensor as bar-handle-rotation-moment change amount M'. The bar-handle-input-operation acquiring unit 90 may include both the pressure sensor and the torque sensor.

A bar-handle-rotation-moment change amount M' may be a rate of change in bar-handle rotation moment M per unit time, for example. The unit time of the bar-handle-rotation-moment change amount M' is not limited to a specific unit.

The actuator 70 includes a motor and a speed reducer. The speed reducer is a transmission member which transmits the rotation of the motor to the steering mechanism 29. However, the configuration of the actuator 70 is not limited to such a configuration. The actuator 70 may be a hydraulic actuator which includes a hydraulic cylinder, a hydraulic vane or the like, for example. The actuator 70 applies a rotational force of the motor as an actuator torque Tr and hence, it becomes easy to increase followability of the actuator torque Tr, generated by the actuator 70, with respect to bar-handle rotation moment M.

The leaning vehicle 1a shown in FIG. 12 causes the actuator 70 to generate an actuator torque Tr based on a bar-handle-rotation-moment change amount M' and at least one of velocity V, a roll angle θ, roll angular velocity ω, and user input. However, the leaning vehicle 1a may cause the actuator 70 to generate an actuator torque Tr based on information other than velocity V, a roll angle θ, roll angular velocity ω and user input. The information other than velocity V, a roll angle θ, roll angular velocity ω, and user input may be the steering angle of the bar handle 8 or an amount of change in steering angle of the bar handle 8 per unit time (steering angular velocity), for example. The actuator control unit 61 may cause, based on the steering angular velocity of the bar handle 8, the actuator 70 to generate an actuator torque Tr which causes the bar handle 8 to rotate in a direction opposite to the direction of the steering angular velocity. In this case, the actuator control unit 61 may switch operations according to the state of a vehicle between an operation which causes the actuator 70 to generate an actuator torque Tr in the direction opposite to the direction of steering angular velocity based on steering angular velocity of the bar handle 8 and an operation which causes the actuator 70 to generate an actuator torque Tr in the direction equal to the direction of bar-handle rotation moment M based on bar-handle-rotation-moment change amount M'. A case where a vehicle state assumes velocity V will be described. When velocity V is in a low velocity range, the actuator control unit 61 causes the actuator 70 to generate an actuator torque Tr based on a bar-handle-rotation-moment change amount M'. On the other hand, when velocity V is in a high velocity range, the actuator control unit 61 causes the actuator 70 to generate an actuator torque Tr based on steering angular velocity of the bar handle 8. When velocity V is in the high velocity range, the actuator control unit 61 causes the actuator 70 to generate an actuator torque Tr which suppresses the rotation of the bar handle 8, for example.

The bar handle 8 rotates about the axis A which extends in the up-down direction UD. A direction along which the axis A extends may lean with respect to the up-down direction UD.

The vehicle body frame 2 is a member which receives a stress applied to the leaning vehicle 1 during traveling. The vehicle body frame 2 may have monocoque, semi-monocoque, or a structure where a vehicle component also functions as a member which receives stress, for example. The vehicle body frame 2 may include a component, such as an engine or an air cleaner, for example.

The leaning vehicle 1 is applicable to a desired leaning vehicle other than a motorcycle. The leaning vehicle 1 may be a three-wheeled motorcycle, a Leaning Multi Wheel (LMW), a bicycle or the like, for example. The steerable wheel 4 may be formed of two wheels arranged in parallel to each other in the leaning-vehicle (1) left-right direction LR. The leaning vehicle 1 may be a straddled vehicle where an occupant rides on the straddled vehicle in a state of straddling a saddle. However, the leaning vehicle 1 is not limited to a straddled vehicle. In the present specification and claims, it is understood that reference to the structure and function of the leaning vehicle 1 applies equally to the leaning vehicle 1a, except where differences are described, above, for example with respect to FIG. 12.

The roll angle sensor 66 may be a gyroscope which detects the roll angle θ and roll angular velocity ω of the vehicle body frame 2, for example. The gyroscope may be a 3-axis gyroscope which detects a roll angle θ, a yaw angle, and a pitch angle, may be a 3-axis gyroscope which detects roll angular velocity ω, yaw angular velocity, and pitch angle velocity, or may be a 6-axis gyroscope which detects a roll angle θ, a yaw angle, a pitch angle, roll angular velocity ω, yaw angular velocity, and pitch angle velocity. The roll angle sensor 66 is not limited to a gyroscope. The roll angle sensor 66 may be an acceleration sensor, may be a sensor which detects angular velocity or torque, may be a sensor which detects an angle of a pendulum hung from a vehicle body frame, may be a distance sensor which measures a distance from the vehicle body frame to a road surface, may be a sensor which calculates the leaning of the vehicle body frame in the left-right direction using image processing of an on-vehicle camera, or may be a combination of at least two of these sensors, for example.

The roll angle sensor 66 may be a sensor which is included in an IMU (Inertial Measurement Unit), or may be a sensor which differs from the sensor included in the IMU.

REFERENCE SIGNS LIST 1, 1a: leaning vehicle
2: vehicle body frame
2a: main frame
2ad: main-frame lower portion
2au: main-frame upper portion
2b: head pipe
3: drive source
4: steerable wheel
5: drive wheel
6: left shock absorber
7: right shock absorber
8: bar handle
8M: bar handle body
8L: left grip
8R: right grip
9: steering shaft
14: bottom bridge
20: transmission member
29: steering mechanism
50: top bridge
61: actuator control unit
65: vehicle velocity sensor
66: roll angle sensor
67: roll angular velocity sensor
68: rider IF 70: actuator
71: actuator body
72: speed reducer
85: mounting part
90: bar-handle-input-operation acquiring unit
90La: left-front pressure sensor
90Lb: left-rear pressure sensor
90Ra: right-front pressure sensor
90Rb: right-rear pressure sensor
90M: bar-handle-rotation-moment-change-amount calculation unit

The invention claimed is:

1. A leaning vehicle comprising:
a vehicle body frame leaning in a leaning-vehicle leftward direction at a time of turning of the leaning vehicle in the leaning-vehicle leftward direction and leaning in a leaning-vehicle rightward direction at a time of turning of the leaning vehicle in the leaning-vehicle rightward direction, a leaning-vehicle frontward direction being a frontward direction in a front-rear direction of the leaning-vehicle, a leaning-vehicle rearward direction being a rearward direction in the front-rear direction of the leaning-vehicle, a leaning-vehicle leftward direction being a leftward direction in a left-right direction of the leaning-vehicle, a leaning-vehicle rightward direction being a rightward direction in the left-right direction of the leaning-vehicle, a vehicle-body-frame up-down direction being an up-down direction of the vehicle body frame, a vehicle-body-frame left-right direction being a left-right direction of the vehicle body frame, a vehicle-body-frame upward direction being an upward direction in the vehicle-body-frame up-down direction, a vehicle-body-frame leftward direction being a leftward direction in the vehicle-body-frame left-right direction, and a vehicle-body-frame rightward direction being a rightward direction in the vehicle-body-frame left-right direction;
a bar handle being supported on the vehicle body frame such that the bar handle is allowed to rotate about an axis extending in the vehicle-body-frame up-down direction, the bar handle including a left grip and a right grip, the left grip being positioned further leftward in the vehicle-body-frame leftward direction than a center of the vehicle body frame in the vehicle-body-frame left-right direction, and the right grip being positioned further rightward in the vehicle-body-frame rightward direction than the center of the vehicle body frame in the vehicle-body-frame left-right direction;
a steerable wheel being supported on the vehicle body frame such that the steerable wheel is allowed to rotate about an axle, the steerable wheel being steered in the leaning-vehicle leftward direction in response to the bar handle being rotated by a rider in a counterclockwise direction as viewed in the vehicle-body-frame downward direction, and the steerable wheel being steered in the leaning-vehicle rightward direction in response to the bar handle being rotated by the rider in a clockwise direction as viewed in the vehicle-body-frame downward direction;
an actuator configured to generate an actuator torque causing the bar handle to rotate in the counterclockwise direction or in the clockwise direction as viewed in the vehicle-body-frame downward direction;
a bar-handle-input-operation acquiring unit configured to acquire a bar-handle-rotation-moment change amount being generated by a rider performing one operation of a left-grip-pushing-force increasing operation where the rider increases a pushing force pushing the left grip in the leaning-vehicle frontward direction, a right-grip-pulling-force increasing operation where the rider increases a pulling force pulling the right grip in the leaning-vehicle rearward direction, a left-grip-pulling-force reducing operation where the rider reduces a pulling force pulling the left grip in the leaning-vehicle rearward direction, a right-grip-pushing-force reducing operation where the rider reduces a pushing force pushing the right grip in the leaning-vehicle frontward direction, a right-grip-pushing-force increasing operation where the rider increases a pushing force pushing the right grip in the leaning-vehicle frontward direction, a left-grip-pulling-force increasing operation where the rider increases a pulling force pulling the left grip in the leaning-vehicle rearward direction, a right-grip-pulling-force reducing operation where the rider reduces a pulling force pulling the right grip in the leaning-vehicle rearward direction, and a left-grip-pushing-force reducing operation where the rider reduces a pushing force pushing the left grip in the leaning-vehicle frontward direction, the bar-handle rotation moment being a rotation moment causing the bar handle to rotate in the counterclockwise direction or in the clockwise direction as viewed in the vehicle-body-frame downward direction, and the bar-handle-rotation-moment change amount being an amount of change in the bar-handle rotation moment per unit time; and
an actuator control unit configured to cause the actuator to generate the actuator torque in the counterclockwise direction as viewed in the vehicle-body-frame downward direction based on the bar-handle-rotation-moment change amount in a case where the bar-handle-rotation-moment change amount in the counterclockwise direction as viewed in the vehicle-body-frame downward direction is generated by the rider performing one operation of the right-grip-pushing-force increasing operation, the left-grip-pulling-force increasing operation, the right-grip-pulling-force reducing operation and the left-grip-pushing-force reducing operation, the actuator control unit being configured to cause the actuator to generate the actuator torque in the clockwise direction as viewed in the vehicle-body-frame downward direction based on the bar-handle-rotation-moment change amount in a case where the bar-handle-rotation-moment change amount in the clockwise direction as viewed in the vehicle-body-frame downward direction is generated by the rider performing one operation of the left-grip-pushing-force increasing operation, the right-grip-pulling-force increasing operation, the left-grip-pulling-force reducing operation, and the right-grip-pushing-force reducing operation.

2. The leaning vehicle according to claim 1, wherein
the actuator control unit causes the actuator to generate the actuator torque based on the bar-handle rotation moment in a case where the bar-handle-rotation-moment change amount is zero, and the bar-handle rotation moment is generated.

3. The leaning vehicle according to claim 2, wherein
in a case where a magnitude of the bar-handle rotation moment in the counterclockwise direction as viewed in the vehicle-body-frame downward direction decreases, and a magnitude of the bar-handle-rotation-moment change amount in the clockwise direction as viewed in the vehicle-body-frame downward direction increases, the actuator control unit causes a magnitude of the actuator torque in the clockwise direction as viewed in the vehicle-body-frame downward direction to increase, and in a case where a magnitude of the bar-handle rotation moment in the clockwise direction as viewed in the vehicle-body-frame downward direction decreases, and a magnitude of the bar-handle-rotation-moment change amount in the counterclockwise direction as viewed in the vehicle-body-frame downward direction increases, the actuator control unit causes a magnitude of the actuator torque in the counterclockwise direction as viewed in the vehicle-body-frame downward direction to increase.

4. The leaning vehicle according to any one of claim 3, wherein in a case where the magnitude of the bar-handle rotation moment in the counterclockwise direction as viewed in the vehicle-body-frame downward direction increases and the magnitude of the bar-handle-rotation-moment change amount in the counterclockwise direction as viewed in the vehicle-body-frame downward direction decreases, the actuator control unit causes the magnitude of the actuator torque in the counterclockwise direction as viewed in the vehicle-body-frame downward direction to reduce, and in a case where the magnitude of the bar-handle rotation moment in the clockwise direction as viewed in the vehicle-body-frame downward direction increases and the magnitude of the bar-handle-rotation-moment change amount in the clockwise direction as viewed in the vehicle-body-frame downward direction decreases, the actuator control unit causes the magnitude of the actuator torque in the clockwise direction as viewed in the vehicle-body-frame downward direction to reduce.

5. The leaning vehicle according to claim 4 further comprising a vehicle velocity sensor configured to detect velocity of the leaning vehicle, wherein the actuator control unit causes the actuator to generate the actuator torque based on the bar-handle-rotation-moment change amount and the velocity of the leaning vehicle.

6. The leaning vehicle according to claim 5 further comprising a lean angle sensor configured to detect a lean angle of the vehicle body frame in the leaning-vehicle left-right direction, wherein the actuator control unit causes the actuator to generate the actuator torque based on the bar-handle-rotation-moment change amount and the lean angle of the vehicle body frame in the leaning-vehicle left-right direction, and the leaning-vehicle left-right direction is a left-right direction of the leaning vehicle.

7. The leaning vehicle according to claim 6 further comprising a lean angular velocity sensor configured to detect an amount of change per unit time in the lean angle of the vehicle body frame in the leaning-vehicle left-right direction, wherein the actuator control unit causes the actuator to generate the actuator torque based on the bar-handle-rotation-moment change amount and the amount of change per unit time in the lean angle of the vehicle body frame in the leaning-vehicle left-right direction, and the leaning-vehicle left-right direction is the left-right direction of the leaning vehicle.

8. The leaning vehicle according to claim 7 further comprising a rider interface configured to receive, from the rider, an input relating to the actuator torque which the actuator generates, wherein the actuator control unit causes the actuator to generate the actuator torque based on the bar-handle-rotation-moment change amount and an output from the rider interface.

9. The leaning vehicle according to claim 1, wherein the bar-handle-input-operation acquiring unit includes a left-front pressure sensor on a front-side surface of the left grip, a left-rear pressure sensor on a rear-side surface of the left grip, a right-front pressure sensor on a front-side surface of the right grip, and a right-rear pressure sensor on a rear-side surface of the right grip, and wherein the an actuator control unit is configured to cause the actuator to generate the actuator torque based on a pressure detected by one or more of the left-front pressure sensor, the left-rear pressure sensor, the right-front pressure sensor on a front-side surface of the right grip, and the right-rear pressure sensor.

10. The leaning vehicle according to claim 1, wherein the actuator is an electric motor, and wherein the actuator control unit controls the electric motor to generate the actuator torque to cause the bar handle to rotate in the counterclockwise direction or in the clockwise direction.

* * * * *